(12) United States Patent
Baldemair et al.

(10) Patent No.: US 10,225,742 B2
(45) Date of Patent: Mar. 5, 2019

(54) TRANSMITTING PARTITIONED RADIO SIGNALS USING MULTIPLE RADIO CHAINS

(71) Applicant: Telefonaktiebolaget LM Ericsson (publ), Stockholm (SE)

(72) Inventors: Robert Baldemair, Solna (SE); Johan Furuskog, Stockholm (SE); Ning He, Sollentuna (SE); Lars Sundström, Södra Sandby (SE); Karl Werner, Segeltorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 123 days.

(21) Appl. No.: 15/300,850

(22) PCT Filed: Jun. 17, 2014

(86) PCT No.: PCT/SE2014/050741
§ 371 (c)(1),
(2) Date: Sep. 30, 2016

(87) PCT Pub. No.: WO2015/152783
PCT Pub. Date: Oct. 8, 2015

(65) Prior Publication Data
US 2017/0026844 A1 Jan. 26, 2017

Related U.S. Application Data

(60) Provisional application No. 61/974,599, filed on Apr. 3, 2014.

(51) Int. Cl.
*H04W 16/02* (2009.01)
*H04B 7/0456* (2017.01)
(Continued)

(52) U.S. Cl.
CPC .......... *H04W 16/02* (2013.01); *H04B 7/0465* (2013.01); *H04B 7/0617* (2013.01); *H04B 7/10* (2013.01); *H04W 72/08* (2013.01)

(58) Field of Classification Search
CPC .... H04W 16/02; H04W 72/08; H04B 7/0617; H04B 7/0465; H04B 7/10
See application file for complete search history.

(56) References Cited

U.S. PATENT DOCUMENTS

| | | | | |
|---|---|---|---|---|
| 6,108,782 A | * | 8/2000 | Fletcher | G06F 8/65 370/245 |
| 7,893,871 B1 | * | 2/2011 | Lee | H01Q 1/246 342/377 |
| 8,126,090 B1 | * | 2/2012 | Nabar | H04L 25/0236 375/316 |

(Continued)

FOREIGN PATENT DOCUMENTS

EP 0989767 A1 3/2000

*Primary Examiner* — Tejis Daya
(74) *Attorney, Agent, or Firm* — Patent Portfolio Builders, PLLC

(57) ABSTRACT

A method performed by a radio network node for determining a partitioning of a first signal into one or more parts to be transmitted to a first radio node. The radio network node comprises two or more antennas, each associated with a respective radio chain. The radio network node and the radio node operate in a wireless communications network. The radio network node determines a number of radio chains, to be used to send the first signal, and determines a partitioning of the first signal into the one or more parts of the first signal over the determined number of radio chains. The one or more parts are to be transmitted to the first radio node. The radio network node determines the number of radio chains and the partitioning based on a scheduling decision associated with the radio network node, and one or more parameters.

29 Claims, 12 Drawing Sheets

(51) Int. Cl.
*H04B 7/06* (2006.01)
*H04B 7/10* (2017.01)
*H04W 72/08* (2009.01)

(56) References Cited

U.S. PATENT DOCUMENTS

| | | | | |
|---|---|---|---|---|
| 8,238,318 B1* | 8/2012 | Negus | ............... | H04W 84/12 |
| | | | | 370/338 |
| 8,271,042 B2* | 9/2012 | Guey | ............... | H04B 7/024 |
| | | | | 455/561 |
| 9,504,018 B2* | 11/2016 | Gormley | ........... | H04L 5/0035 |
| 9,787,386 B2* | 10/2017 | Strong | ............ | H04B 7/0452 |
| 9,853,702 B1* | 12/2017 | Liang | ............... | H04L 5/0007 |
| 9,867,054 B2* | 1/2018 | Zhang | ............... | H04W 16/14 |
| 9,882,693 B2* | 1/2018 | Sanderovich | ....... | H04L 5/005 |
| 2002/0086708 A1 | 7/2002 | Teo et al. | | |
| 2003/0050018 A1* | 3/2003 | Weissman | ........... | H04B 1/525 |
| | | | | 455/82 |
| 2005/0153703 A1* | 7/2005 | Juntti | ............. | H04W 52/243 |
| | | | | 455/452.2 |
| 2006/0222100 A1* | 10/2006 | Behzad | ............. | H04B 1/005 |
| | | | | 375/267 |
| 2006/0270343 A1* | 11/2006 | Cha | ............... | H04B 7/0413 |
| | | | | 455/25 |
| 2007/0099584 A1* | 5/2007 | Niu | ................. | H04B 7/04 |
| | | | | 455/101 |
| 2008/0137770 A1* | 6/2008 | Behzad | ............. | H03F 1/3247 |
| | | | | 375/285 |
| 2008/0166974 A1* | 7/2008 | Teo | ............... | H04L 27/0006 |
| | | | | 455/67.11 |
| 2008/0212538 A1* | 9/2008 | Molisch | ........... | H04B 7/0417 |
| | | | | 370/334 |
| 2009/0019150 A1* | 1/2009 | Li | ................. | H04B 7/086 |
| | | | | 709/224 |
| 2009/0303955 A1* | 12/2009 | Teo | ............... | H04B 7/061 |
| | | | | 370/329 |
| 2013/0072186 A1* | 3/2013 | Picker | ............. | H04W 8/12 |
| | | | | 455/432.1 |
| 2013/0230028 A1* | 9/2013 | Calcev | ............. | H04W 72/1231 |
| | | | | 370/336 |
| 2014/0106686 A1* | 4/2014 | Higgins | ........... | H04B 1/40 |
| | | | | 455/78 |
| 2015/0017923 A1* | 1/2015 | Mutya | ............. | H04W 24/10 |
| | | | | 455/67.11 |
| 2015/0085944 A1* | 3/2015 | Mobasher | ........... | H04B 7/0413 |
| | | | | 375/267 |

* cited by examiner

TRANSMITTING PARTITIONED RADIO SIGNALS USING MULTIPLE RADIO CHAINS

TECHNICAL FIELD

The present disclosure relates generally to a radio network node, and a method therein for determining a partitioning of a first signal into one or more parts to be transmitted to a first radio node. The present disclosure relates as well to a computer program and a computer-readable storage medium, having stored thereon the computer program to carry out the aforementioned methods.

BACKGROUND

Communication devices such as wireless devices are also known as, e.g., User Equipments (UE), mobile terminals, wireless terminals and/or mobile stations. Wireless devices are enabled to communicate wirelessly in a cellular communications network or wireless communication system, sometimes also referred to as a cellular radio system, wireless communications network, or cellular network. The communication may be performed, e.g., between two wireless devices, between a wireless device and a regular telephone, and/or between a wireless device and a server via a Radio Access Network (RAN) and possibly one or more core networks, comprised within the cellular communications network.

Wireless devices may further be referred to as mobile telephones, cellular telephones, laptops, tablets or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The wireless communications network covers a geographical area which is divided into cell areas, wherein each cell area being served by an access node such as a base station, e.g., a Radio Base Station (RBS), which sometimes may be referred to as, e.g., "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

Beamforming is a general set of techniques to control a radiation pattern of a radio signal. To achieve this, several antenna elements may be used to control a total antenna pattern by adjusting transmit weights of signal components radiating from each individual antenna element with purpose of directing the transmitted energy towards a position of an intended receiver.

Beamforming, in general, is an enabler for enhancing the capacity and the energy efficiency in a wireless communications network. The received signal strength is increased due to an increased antenna gain resulting from the beamforming operation. At the same time, interference is spread over a smaller area, typically resulting in reduced interference levels for all user equipments, such as wireless devices, in the system. Increased Signal to Interference plus Noise Ratio (SINR) results in higher bit-rates and higher capacity. Higher SINR in a packet oriented system results in shorter packet transmission times. This also helps to reduce the energy consumption in the system, such as the wireless communications network, since transmitters and receivers may be put into idle mode during a larger ratio of time.

In beamforming, in particular at sub-millimeter Wave (mmW) frequencies, e.g., 10-30 GigaHertz (GH) and mmW frequencies, e.g., 30-300 GH, an antenna, even with many antenna elements, may remain reasonable sized, since the size of each antenna element and distance between antenna elements decreases with increasing frequency. Furthermore, if omni-directional antennas are used at mmW frequencies, the received power decreases, since the effective antenna area of an omni-directional antenna decreases with frequency. To compensate for this effect, the antenna area relative to the area of the omni-directional antenna, thus aperture, may be increased. But the antenna area still remains reasonable sized due to the shorter wave lengths at mmW frequencies, relative to traditional cellular frequencies, to capture more power resulting in directive antennas. Moreover, coverage becomes more challenging at higher frequencies due to increased path loss since propagation mechanisms such as diffraction are frequency dependent, which may also be compensated for with beamforming. Beamforming may be used to implement directive antennas since beamforming enables adjustable beam directions.

FIG. 1 depicts one possible beamforming hardware setup 100. The input to the hardware is typically a baseband signal, e.g. a complex-valued quantity represented by an In-phase (I) and a Quadrature (Q) component. A baseband signal is a signal whose frequency range is a frequency range extending over frequencies close to 0 Hz. It is common to perform parts of the signal processing in baseband and then, usually in an up-conversion mixer in radio, convert it to the desired carrier frequency. The baseband signal may be fed to the beamforming hardware setup 100 in the form or separate streams or layers. In LTE, a layer may be defined by a reference signal. It may be described as an information bearing signal carrying data for a single user. A layer is associated with a continuous or non-continuous Frequency Division Multiplexing/Code Division Multiplexing (FDM/CDM) allocation. A layer may be transmitted using a set of beamforming weights, also known as precoders, on a set of antennas. The layer is composed of component signals. In FIG. 1, three layers or streams, depicted as squares Stream 1, Stream 2 and Stream 3, are fed to the beamforming hardware setup 100 through a BaseBand port (BB herein) 110. The BB 110 may be defined as an interface in a radio Transmitter (Tx), or Receiver (Rx), over which an information carrying signal is conveyed, where the information carrying signal has a center frequency lower than an intended carrier frequency. An Inverse Fast Fourier Transform (IFFT) 112 may be used to transform a signal from frequency domain representation to time domain representation. The BB 110 may be associated with a number of Digital to Analog Converters (DAC) 115 in Tx direction. A number of phase shifters 116 may be comprised in the beamforming hardware setup 100. A number of mixers 117 may also be comprised. The mixers 117 may convert a signal from a lower center frequency, such as zero, i.e., analog baseband, or an intermediate frequency up to a Radio Frequency, RF. In FIG. 1, all BBs 110 share, i.e., reuse, the same set of antenna elements 120. The advantage is that the number of antenna elements 120 may be kept low since the antenna elements 120 are reused across the BBs. The disadvantage is that a Power Amplifier (PA) 130, out of a number of PAs 130, is always fed with a high Peak to Average Power Ratio (PAPR) signal since, even if each baseband signal has low PAPR, its input signal is the superposition of multiple signals, and superposition of signals results in high PAPR. In FIG. 1, the lower arrow indicates that phase shifting, or more generally, applying beam forming weights, may be done at baseband, prior to up-conversion. However, it may also be done at some intermediate frequency or directly at the RF before the PA 130 and before a combiner/summer, upper arrow. The upper arrow indicates combining of the phase shifted baseband signals prior to respective up-conversion and the PA 130. As for the phase shifters, beam forming weights, this may be done at some intermediate frequency or directly at the RF frequency, before the PA 130. This combiner may, however, not be needed if there is one PA per stream and a phase shifted baseband signal. The beamforming hardware setup 100 also comprises a Local Oscillator (LO) 140.

Another hardware setup 200 is depicted in FIG. 2, where each BB is connected to its own set of antenna elements. In the example depicted in FIG. 2 for this hardware setup 200, there are four different BBs: BB1 221, BB2 222, BB3 223 and BB4 224. Thus, in this alternative hardware setup 200, antenna elements are not reused across the BB, but each BB has its own set of antenna elements. The example of FIG. 2 also comprises a radio chain for each of the BB. A radio chain may be described as a group of physical components that are comprised between the DAC 115, which is comprised in the radio chain, and one antenna element or an array of antenna elements connected, through the components, to the DAC 115. The components may enable processing of a signal fed to the DAC 115 for radio transmission of the processed signal through the antenna element, or the array. The one antenna element or the array of antenna elements may also be comprised in the radio chain, as depicted in the example of FIG. 2. In FIG. 2, an exemplary radio chain is indicated with a dashed rectangle. In this example, the radio chain may comprise: the DAC 115, the number of phase shifters 116, the number of mixers 117, the number of PAs 130, the LO 140, and the number of antenna elements 120. Other components, which are not depicted, may also be comprised in the radio chain.

The drawback of a setup such as that of FIG. 2 is the increased number of antenna elements 120, which may lead to increased cost and increased size. On the positive side, the input signal to the PA may have low PAPR, provided the baseband signal has low PAPR, e.g. Discrete Fourier Transform Spread-Orthogonal Frequency Division Multiplexing (DFTS-OFDM). The hardware setup 200 may be used for transmissions with or without using beamforming.

Thus, while the architecture of a system such as that of FIG. 2 provides advantages over that of FIG. 1, it still suffers from high cost and size to the increased number of antennas, which may not be optimally utilized.

SUMMARY

It is an object of embodiments herein to improve the performance in a wireless communications network by providing an improved usage of transmission hardware.

According to a first aspect of embodiments herein, the object is achieved by a method performed by a radio network node. The method is for determining a partitioning of a first signal into one or more parts to be transmitted to a first radio node. The radio network node comprises two or more antennas. Each of the two or more antennas is associated with a respective radio chain out of two or more radio chains comprised in the radio network node. The radio network node and the first radio node operate in a wireless communications network. The radio network node determines a number of radio chains out of the two or more radio chains, to be used to send the first signal to the first radio node. The radio network node determines the partitioning of the first signal into the one or more parts of the first signal over the determined number of radio chains. The one or more parts are to be transmitted to the first radio node. The determining of the number of radio chains and the determining of the partitioning are based on a scheduling decision associated with the radio network node, and one or more parameters.

According to a second aspect of embodiments herein, the object is achieved by the radio network node. The radio network node is configured to determine the partitioning of the first signal into one or more parts to be transmitted to the first radio node. The radio network node comprises the two or more antennas. Each of the two or more antennas is associated with the respective radio chain out of the two or more radio chains comprised in the radio network node. The radio network node and the first radio node are configured to operate in the wireless communications network. The radio network node is configured to determine the number of radio chains out of the two or more radio chains, to be used to send the first signal to the first radio node. The radio network node is also configured to determine the partitioning of the first signal into the one or more parts of the first signal over the determined number of radio chains. The one or more parts are to be transmitted to the first radio node. The radio network node is further configured to determine the number of radio chains and the partitioning based on the scheduling decision associated with the radio network node, and the one or more parameters.

According to a third aspect of embodiments herein, the object is achieved by a computer program, comprising instructions which, when executed on at least one processor, cause the at least one processor to carry out the method performed by the radio network node.

According to a fourth aspect of embodiments herein, the object is achieved by a computer-readable storage medium, having stored thereon the computer program, comprising instructions which, when executed on at least one processor, cause the at least one processor to carry out the method performed by the radio network node.

By determining the number of radio chains to be used, and the partitioning of the first signal into the one or more parts, it is possible for the radio network node to maintain a low PAPR of the input signal to the PA, which leads to one or more of the following advantages: lower cost, lower size, lower power consumption, and lower need for cooling of the transmission system. Another advantage in that the radio network node dynamically determines the number of radio chains and the partitioning of the first signal may be that when output power requirements are low in a transmission, the number of active PAs may be reduced.

The dynamic radio chain configuration and partitioning enables maximum utilization of the available hardware resource while it may, for example, simultaneously meet quality of service requirements expressed as, e.g., user data rate, and system capacity, e.g., number of users to be served.

Further advantages of some embodiments disclosed herein are discussed below.

BRIEF DESCRIPTION OF THE DRAWINGS

Examples of embodiments herein are described in more detail with reference to attached drawings in which.

DETAILED DESCRIPTION

As part of developing embodiments herein, the problems associated with the prior art, will first be identified and discussed.

Figure 2:
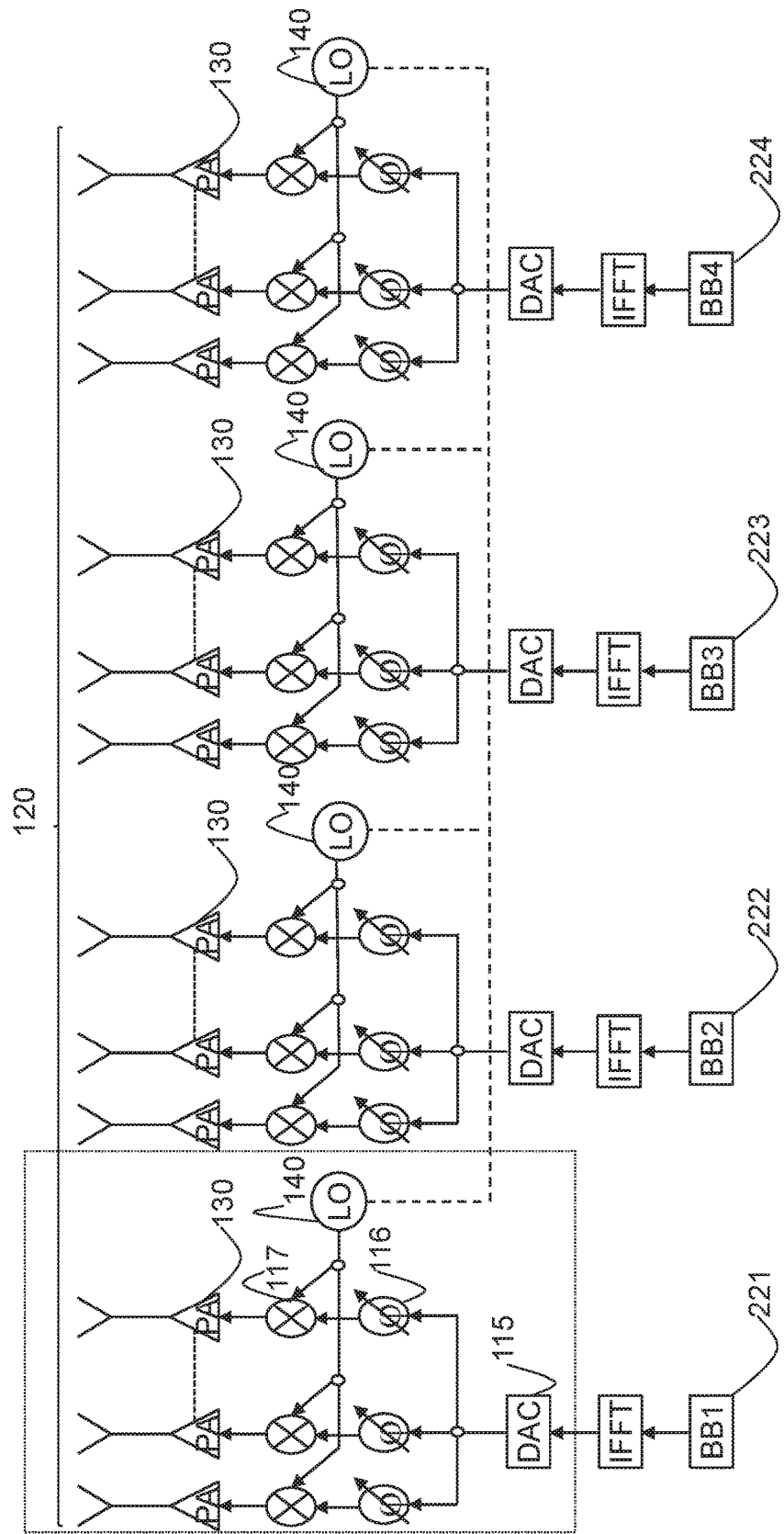
FIG. 2 is a schematic diagram illustrating an exemplary beamforming hardware setup.

In prior methods, the usage of the hardware depicted in the example of FIG. 2 is fixed, as typically set by a configuration. This fixed usage of the architecture may lead to different undesirable disadvantages that represent a sub-optimal usage of the architecture.

Figure 3:
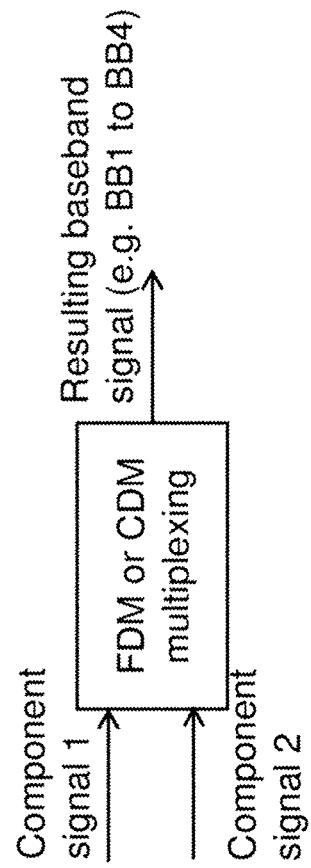
FIG. 3 is a schematic block diagram illustrating aspects of prior art transmission methods.

For example, in prior uses of the hardware depicted in FIG. 2, each BB is used to transmit a single layer to one user, or, in some cases, to multiple users, such as when operating in Multiple-Input Multiple-Output (MIMO) mode. That is, for Multiple-Input Multiple-Output transmissions, individual antennas may be used to transmit each baseband stream. Each baseband stream may also be referred to herein as a layer or a "signal". A single layer is intended for a single user, such as a wireless device. A single layer may be divided into multiple component signals. All component signals associated with a given layer are intended for the same user equipment. A baseband signal may comprise multiple layers superimposed. Alternatively, the information from multiple user equipments comprised in a baseband signal may be multiplexed using Frequency Division Multiplexing (FDM), Code Division Multiplexing (CDM) or Time Division Multiplexing (TDM). If Frequency Division Multiplexing or Code Division Multiplexing is used, in both cases multiple signals are superposed in the resulting baseband signal, and thus, the Power Amplifier input signal has high Peak to Average Power Ratio, even if the component signals have low Peak to Average Power Ratio, see FIG. 3. In FIG. 3, the baseband signal, e.g. going to BB1 221 to BB4 224 in FIG. 2, is the superposition of multiple component, i.e., per-user, signals. In particular, two component signals for FIG. 3: component signal 1 and component signal 2. If Frequency Division Multiplexing or Code Division Multiplexing is used, the resulting baseband signal has high Peak to Average Power Ratio, even if each of the components, i.e., per-user, signals have low Peak to Average Power Ratio. The Peak to Average Power Ratio is the peak power of a transmission, divided by the average power of the transmission. The Peak to Average Power Ratio may set a requirement on the hardware to be used for transmission, especially on the Power Amplifier, such that high Peak to Average Power Ratio implies high cost Power Amplifier. Therefore it is desirable to transmit with a low Peak to Average Power Ratio.

Embodiments herein provide for ways to use the hardware architecture such as that depicted in FIG. 2, so that a single component signal may be transmitted per baseband port. One advantage of this is the lower Peak to Average Power Ratio of a single component signal as compared to the Peak to Average Power Ratio of multiple component signals superimposed, which in turn leads to the advantages mentioned earlier. Embodiments herein may provide for ways to dynamically configure or reallocate the resources based on the number of user equipments to be transmitted to, and/or required power level per user equipment during one time period. As a result of the embodiments just described, the HardWare (HW) resources may be maximally utilized. Moreover, user performance, sensitivity, coverage and system capacity may be traded-off by dynamically allocating different number of transmitter chains to user equipments. In addition, if the component signal has low Peak to Average Power Ratio, the signal fed into the Power Amplifier has low Peak to Average Power Ratio too, enabling smaller and more power-efficient Power Amplifiers.

For example, the available BB of a setup such as that of FIG. 2 may be used for one Frequency Division Multiplexing and/or Code Division Multiplexing component input signal per BB. If each component input signal has low Peak to Average Power Ratio, e.g. precoded Orthogonal Frequency Division Multiplexing such as Discrete Fourier Transform Spread-Orthogonal Frequency Division Multiplexing, the signal fed into a Power Amplifier is also of low Peak to Average Power Ratio, enabling smaller and more power efficient Power Amplifier implementations. This may lead to the advantages of: lower cost, lower size, lower power consumption, and lower need for cooling of the transmission system.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 4:
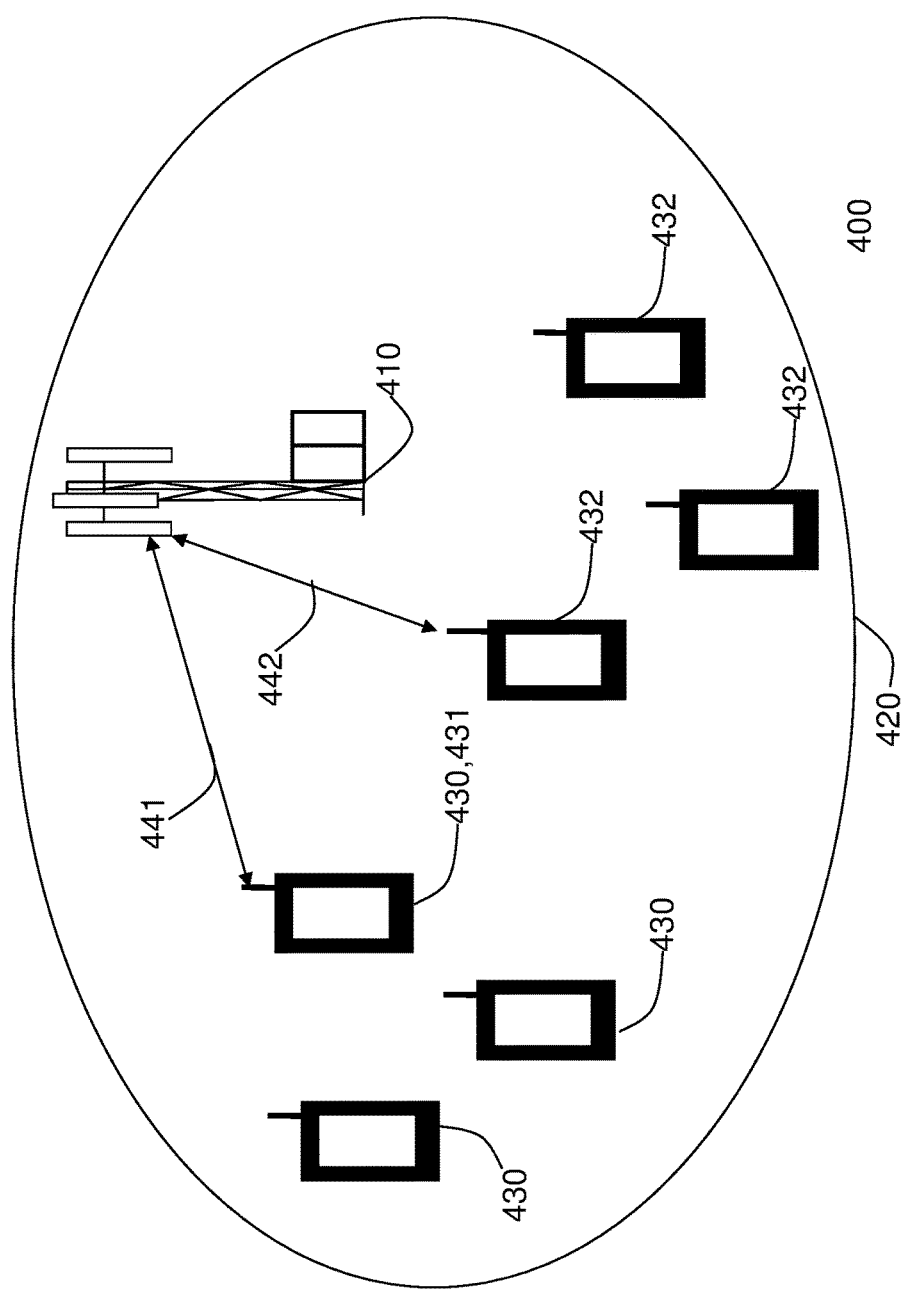
FIG. 4 is a schematic block diagram illustrating embodiments in a wireless communications network, according to embodiments herein.

FIG. 4 depicts a particular example of a wireless communications network 400, sometimes also referred to as a cellular radio system, cellular network or wireless communications system, in which embodiments herein may be implemented. The wireless communications network 400 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access, Universal Terrestrial Radio Access (UTRA) TDD, GSM network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system, system operating in mmW bands or any cellular network or system.

The wireless communications network 400 comprises a radio network node 410. The radio network node 410 may be, for example, a base station such as e.g., an eNB, eNodeB, or a Home Node B, a Home eNode B, femto Base Station, BS, pico BS, a macro eNodeB, access node or any other network unit capable to serve a wireless device or a machine type communication device in the wireless communications network 400. In some particular embodiments, the radio network node 410 may be a stationary relay node or a mobile relay node. In some embodiments, the radio network node 410 may be a wireless device, as described below.

The wireless communications network 400 covers a geographical area which is divided into cell areas, wherein each cell area is served by a network node, although, one network node may serve one or several cells, and one cell can be served by one or several network nodes. In the non-limiting example depicted in FIG. 4, the radio network node 410 serves a cell 420. The radio network node 410 may be of different types, based on transmission power and thereby also cell size. For example, a pico base station has low transmission power and a macro eNodeB has high transmission power. Typically, wireless communications network 400 may comprise more cells similar to the cell 420, served by their respective radio network node. This is not depicted in FIG. 4 for the sake of simplicity. The radio network node 410 may support one or several communication technologies, and its name may depend on the technology and terminology used. In 3GPP LTE, the radio network node 410 may be directly connected to one or more core networks, which are not depicted.

The wireless communications network 400 also comprises one or more radio nodes 430, whereof one radio node is referred to as a first radio node 431. In some embodiments, at least one of the one or more radio nodes 430 may be another radio network node similar to the radio network node 410. In other embodiments, at least one, e.g., the first radio node 431, of the one or more radio nodes 430 may be a wireless device. In the example depicted in FIG. 4, all of the one or more radio nodes 430 are wireless devices. The one or more radio nodes 430, 431 operate in the wireless communications network 400. In the example scenario of FIG. 4, the one or more radio nodes 430 comprise only three wireless devices, for the sake of simplicity. Each of the one or more radio nodes 430, 431, when being a wireless device is a wireless communication device or radio communication device such as a UE, which is also known as e.g., mobile terminal, wireless terminal, mobile station, mobile telephone, cellular telephone, smart phone, and/or target device. Further examples of different wireless devices include laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, device to device (D2D) UE or wireless devices, devices equipped with a wireless interface, such as a printer or a file storage device, Machine Type Communication (MTC) devices such as sensors, e.g., a sensor equipped with UE, just to mention some examples.

Each of the one or more radio nodes 430, 431, when being a wireless device is wireless, i.e., it is enabled to communicate, e.g., voice and/or data, wirelessly in the wireless communications network 400. The communication may be performed e.g., between two devices, between a device and a regular telephone and/or between a device and another entity, such as a server or any other radio network unit capable of communicating over a radio link in the wireless communications network 400. The communication may be performed e.g., via a Radio Access Network.

The one or more radio nodes 430 are located within the cell 420. Any of the one or more radio nodes 430 is configured to communicate with the radio network node 410 over respective radio link. Only a first radio link 441 between the first radio node 431 and the radio network node 410 is depicted in FIG. 4 to simplify the figure.

The wireless communications network 400 also comprises one or more second radio nodes 432 to which a description equivalent to that provided for the one or more radio nodes 430 applies. In the case of the one or more second radio nodes 432, each of the radio nodes in this group is configured to communicate with the radio network node 410 over respective radio link. Only a second radio link 442 is depicted in FIG. 4 to simplify the figure. In the particular example depicted in FIG. 4, all the one or more second radio nodes 432, which in this example are also three, are wireless devices.

Embodiments of a method performed by the radio network node 410 for determining a partitioning of a first signal into one or more parts to be transmitted to the first radio node 431, will now be described with reference to the flowchart depicted in FIG. 5. The radio network node 410 comprises two or more antennas. Each of the two or more antennas is associated with a respective radio chain out of two or more radio chains comprised in the radio network node 410. The radio network node 410 and the first radio node 431 operate in the wireless communications network 400.

In some embodiments, each one of the number of radio chains is used to convert a respective part out of the one or more parts of the first signal into a respective radio signal to be transmitted to the first radio node 431.

In some particular examples, the radio network node 410 comprises an architecture similar to that depicted in FIGS. 6-11, which will be described later, with more or less radio chains, as described earlier. The exact order of some functions or components, such as phase shifters and mixers, as shown, are an example implementation, and are not limiting. That is, there may be different architecture alternatives. For example, in some embodiments, hardware components enabling Inverse Fast Fourier Transform and a BaseBand port may be the same, i.e., the hardware components are shared, which is not depicted.

Figure 5:
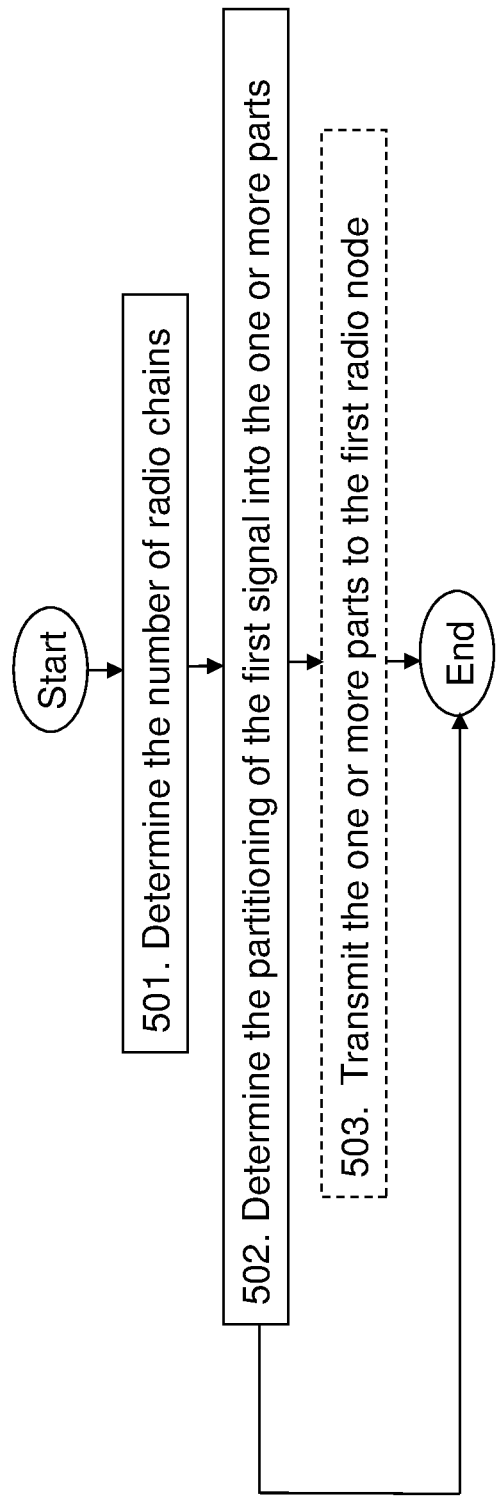
FIG. 5 is a flowchart depicting embodiments of a method in a radio network node, according to embodiments herein.

FIG. 5 depicts a flowchart of the one or more actions that are or may be performed by the radio network node 410 in embodiments herein. In the Figure, a box with dashed lines indicates that the action is optional.

The method for transmitting may comprise the following actions, which actions may as well be carried out in another suitable order than that described below. In some embodiments, all the actions may be carried out, whereas in other embodiments only some action/s may be carried out.

In the following description, a user or the user may refer to a radio node such as the first radio node 431.

Action 501

The radio network node 410 may obtain, e.g., generate or receive, information, e.g., data, that may need to be sent to the first radio node 431. For example, the information may be received from another network node in the wireless communications network 400 using a secondary interface, e.g. a gateway using a backhaul link. The radio network node 410 may process the information in preparation for the transmission to the first radio node 431 so that the information is converted into one or more layers or signals.

The radio network node 410 may thus obtain one or more signals for the first radio node 431, which comprise the first signal, and which first signal is to be sent to the first radio node 431.

In action 501, the radio network node 410 determines a number of radio chains out of the two or more radio chains, to be used to send the first signal to the first radio node 431. The determining the number of radio chains is dynamic, i.e., not fixed. That is, the determining the number of radio chains is based on a scheduling decision associated with the radio network node 410 and one or more parameters. The one or more parameters are described in the next action.

In some embodiments, the scheduling decision comprises a number of signals to be transmitted in a time period to the one or more radio nodes 430 comprising the first radio node 431. The one or more parameters are associated with the number of signals.

The fact that the scheduling decision comprises a number of signals to be transmitted in a time period to the one or more radio nodes 430 means that the determination of the number of radio chains may be valid, i.e., it may be used, in one scheduling time unit or several contiguous or non-contiguous number of scheduling time units, i.e., in the time period.

In some embodiments, the number of signals comprises the first signal. Each signal out of the number of signals is a layer. Each layer comprises information for a single radio node, such as the first radio node 431, out of the one or more radio nodes 430.

Thus, in some embodiments, each layer may be sent to a single radio node, such as the first radio node 431, e.g., Layer1→Node1, Layer2→Node2, etc. . . . , whereas in other embodiments, multiple layers may be sent to the same radio node, e.g., Layer1→Node1, Layer2→Node2, Layer3→Node2, Layer4→Node3.

In some embodiments, determining the number of radio chains based on the one or more parameters comprises determining the number of radio chains based on a function of the one or more parameters.

In some embodiments, the number of radio chains is determined based on a scheduling decision and a function of at least one of the following three parameters of the one or more parameters: an Equivalent Isotropically Radiated Power, EIRP, for the first signal, a maximum output power of a single radio chain of the two or more radio chains and an antenna gain of an antenna element subarray connected to a single radio chain. The Equivalent Isotropically Radiated Power may be based on the scheduling decision.

In some embodiments, the number of radio chains is determined based on a function of at least the following two parameters of the one or more parameters: a maximum output power of a single radio chain of the two or more radio chains and a nominal total output power for the first signal. The maximum output power of the single radio chain may be based on the scheduling decision. In some embodiments, the nominal total output power for the first signal is based on the scheduling decision.

Action 501 may be performed for each of the number of signals to be transmitted in the time period to the one or more radio nodes 430.

Further description of how this action may be implemented will be provided below, in relation to two exemplary embodiments.

Action 502

The radio network node 410 may then determine how the information comprised in the first signal may be distributed over the determined number of radio chains, i.e., how it may be assigned to each of the determined number of radio chains, in order to send the first signal to the first radio node 431.

Therefore, in this action, the radio network node 410 determines the partitioning of the first signal into the one or more parts of the first signal over the determined number of radio chains. By this, it is meant that the radio network node 410 may generate one or more parts based on the content of the first signal, and the radio network node 410 may distribute the one or more parts over the determined number of radio chains. The one or more parts are to be transmitted to the first radio node 431. The determining of the partitioning is based on the scheduling decision associated with the radio network node 410, and the one or more parameters. That is, the radio network node 410 may determine the partition of the baseband signal transmitted to a single user over the separate radio chains. The radio network node 410 may use a set of parameters to determine how this partitioning is to be made, e.g., for a particular user.

In some embodiments, each of the one or more parts of the first signal is a component signal of the layer, as described earlier.

The determining the partitioning may comprise determining at least one of: the first radio signal is to be transmitted per one radio chain of the two or more radio chains, the first radio signal is to be transmitted per group of radio chains of the two or more radio chains, and one out of a Frequency Division Multiplexing component signal, a Code Division Multiplexing component signal and a Frequency Division Multiplexing/Code Division Multiplexing component signal is to be transmitted per one radio chain of the two or more radio chains.

The one or more parameters may comprise at least one of the following: a) one out of: a Frequency Division Multiplexing, Code Division Multiplexing, and a combination of Frequency Division Multiplexing and Code Division Multiplexing, Frequency Division Multiplexing/Code Division Multiplexing, allocation of a transmission intended for the particular user, such as the first radio node 431, b) a number of signals, comprising the first signal, intended for the first radio node 431; that is, the number of signals, i.e., streams, intended for the particular user, c) a number of radio chains available for transmission in a determined time period; some examples of this may be a fixed number of chains for transmission of the first signal, a fixed number of chains for transmission of all signals, or a fixed number of signals for transmission to the first radio node 431, d) a usage of each of the available radio chains by other transmissions to second radio nodes 432 comprised in the wireless communications network 400, and e) an output power required for the transmission of the first signal, e.g., in case of power controlled transmissions; particular embodiments of this parameter may be Equivalent Isotropically Radiated Power, such as $EIRP^s$, which will be defined later, or a nominal total output power for the first signal, such as $P^s$, which will be defined later.

The radio network node 410 may need to take into account certain restrictions when determining how the baseband signal, e.g., the first signal, is to be partitioned. These restrictions are also comprised in the one or more parameters and may include: a) a targeted array gain for transmission of the first signal, as there may be different restrictions in allowed Equivalent Isotropically Radiated Power in different spatial directions of the antenna, which may be addressed by only utilizing a single BaseBand port when transmitting in some directions, such as a large vertical angle measured from the horizon and below, while multiple BaseBand ports are utilized per spatial layer in other directions, such as for a small vertical angle relative the horizon, b) a limitation imposed by the first radio node 431 on continuity of the radio channel over the Frequency Division Multiplexing, Code Division Multiplexing or Frequency Division Multiplexing/Code Division Multiplexing allocation; This limitation may be imposed due to assumptions made by the receiver on continuity of the radio channel over the Frequency Division Multiplexing/Code Division Multiplexing allocation. This may imply, for example, that for a single component signal with low Peak to Average Power Ratio that utilizes the bandwidth of two adjacent Frequency Division Multiplexes, the two adjacent Frequency Division Multiplexing resources may need to be transmitted using the same Power Amplifier/array while another pair of adjacent Frequency Division Multiplexing resources may be transmitted by different Power Amplifier/arrays, c) limitations on the maximum output power per power amplifier comprised in each of the two or more radio chains; a particular embodiment of this parameter may be a maximum output power of a single radio chain of the two or more radio chains, such as $P_{max}$, which will be defined later, d) limitations on the maximum Peak to Average Power Ratio, Peak to Average Power Ratio, for transmission of the one or more parts of the first signal on a single radio chain, e) limitations on the power consumption in any given transmission, and f) a fixed parameter, such as an antenna gain of an antenna element subarray connected to a single radio chain, such as $G_{subarray}$, which will be defined later.

In some embodiments, the radio network node 410 may be configured to minimize the number of active Power Amplifier in any given transmission, in order to limit power consumption. One reason for reducing power consumption may be to extend battery life of battery powered network nodes, to limit the amount of heat created, and thus limit the need for cooling, and to make the network node as a whole less power consuming, which is beneficial due to cost reasons and due to the environmental impact of the power generation.

For example, if the total output power of the transmission on a single stream, such as the first signal, is lower than the maximum output power of a single Power Amplifier, then it may be possible to perform the transmission using a single Power Amplifier and the other Power Amplifiers may be turned off. If, on the other hand, the total output power of the transmission is higher than what may be delivered by a single Power Amplifier, the Frequency Division Multiplexing/Code Division Multiplexing resources of the single stream may be partitioned on multiple Power Amplifiers.

In another example, when partitioning the transmission of a single stream so that one Power Amplifier transmits one part of the band while another Power Amplifier transmits another part of the band, then it may be desirable that two parts of the band do not occupy the same Physical Resource Blocks Groups (PRG).

In some embodiments, the partitioning is made on Frequency Division Multiplexing resources, so that a radio chain of the two or more radio chains transmits on Frequency Division Multiplexing resources. In these embodiments, the partitioning is determined based on a function of at least: a total number of self-contained Frequency Division Multiplexing resources of the first signal, based on the scheduling decision, and a largest bandwidth in terms of Frequency Division Multiplexing resources over which the first radio node 431 interpolates a channel to be computed by the first radio node 431 for demodulation of the one or more parts of the first signal. The total number of self-contained Frequency Division Multiplexing resources may be based on the scheduling decision.

In some embodiments, each of the one or more parts of the first signal is identical to the first signal up to a scaling factor and a delay. The scaling factor may be different for different Frequency Division Multiplexing resources. These embodiments may be characterized in that each part of the one or more parts of the first signal has a bandwidth no smaller than the bandwidth of the first signal.

For example, according to the partitioning of the first signal performed in this action, the hardware architecture shown in FIG. 2, a BaseBand port may not be fed with a superposition of multiple component signals but just with a single part of the one or more parts, e.g., a single component signal. To enable Frequency Division Multiplexing or Code Division Multiplexing, one BaseBand port may be needed for each component signal. Deviation from this rule may be potentially possible if the superposed signal is of low power, and the required power backoff, to stay within the linear region of the Power Amplifier and avoid clipping, may be afforded; however, at the cost of lower Power Amplifier efficiency.

Action 502 may be performed for each of the number of signals to be transmitted in the time period to the one or more radio nodes 430.

Different examples of how a BaseBand port such as that in FIG. 2 may be used to enable various Frequency Division Multiplexing examples, according to embodiments herein will be described later in relation to FIGS. 6-11.

Further description of how action 502 may be implemented will also be provided below, in relation to the second exemplary embodiment.

By the radio network node 410 determining the number of radio chains to be used and determining the partitioning of the first signal into the one or more parts, it is possible for the radio network node 410 to maintain a low Peak to Average Power Ratio of the input signal to the Power Amplifier, which leads to the advantages of: lower cost, lower size, lower power consumption, and lower need for cooling of the transmission system.

Another advantage of the radio network node 410 determining the number of radio chains and determining the partitioning of the first signal dynamically is that when output power requirements are low in a transmission, the number of active Power Amplifiers may be reduced.

The array gain may also be controlled by combining the radio chains in different ways, such when a large array gain is needed, more radio chains are used.

And the dynamic radio chain configuration and partitioning enables maximum utilization of the available hardware resource while it may, for example, simultaneously meet quality of service requirements expressed as, e.g., user data rate, and system capacity, e.g., number of users to be served. The provided data rate to a user may depend on, besides allocated bandwidth, also on allocated output power and array gain, i.e., the number of radio chains assigned to that particular user. An alternative may be, for example, to assign the radio chains to different users which gives a lower data rate for each user but increases the number of served users.

Action 503

The radio network node 410 may transmit the one or more parts of the first signal over the determined number of radio chains to the first radio node 431. In these embodiments, each of the one or more parts of the first signal are respectively transmitted as radio signals.

Action 503 may be performed for each of the number of signals to be transmitted in the time period to the one or more radio nodes 430. That is, Actions 501-503 may be performed for each of the number of signals to be transmitted in the time period to the one or more radio nodes 430.

Figure 1:
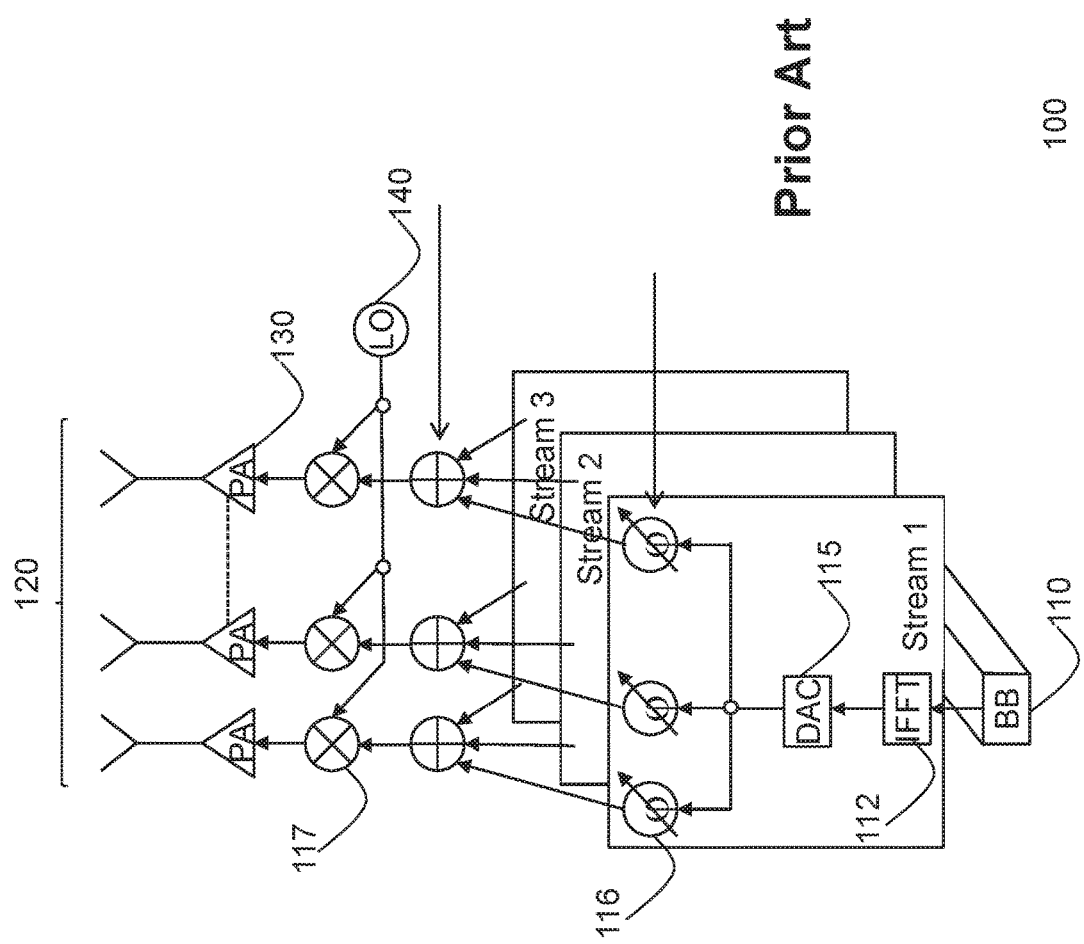
FIG. 1 is a schematic diagram illustrating an exemplary beamforming hardware setup.

In relation to action 502, the following FIGS. 6-11 show different examples of how a BaseBand port such as that in FIG. 2 may be used to enable various Frequency Division Multiplexing examples, according to embodiments herein. The same is also possible for Code Division Multiplexing. In Code Division Multiplexing, the one or more parts, e.g., component signals may be separated by codes rather than frequencies. Some of the elements described in FIGS. 6-11 are equivalent to those described in relation to FIGS. 1 and 2, and will therefore not be repeated here. The arrow in FIGS. 6-11 schematically represents different frequencies, f1, f2, f3 and f4, dividing the bandwidth into exemplifying segments.

Figure 6:
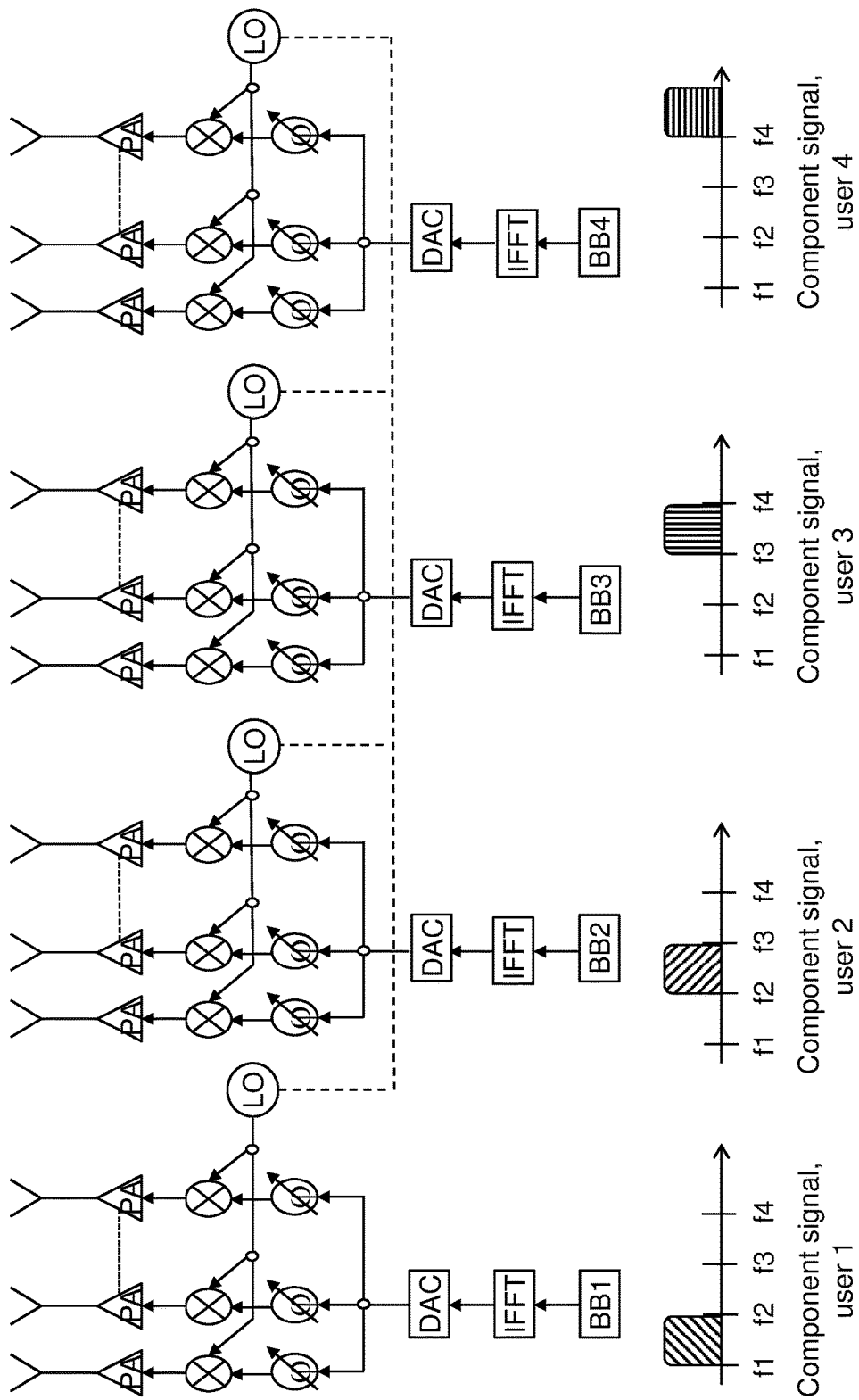
FIG. 6 is a schematic diagram depicting embodiments of a method in a radio network node, according to embodiments herein.

FIG. 6 depicts an example of possible Frequency Division Multiplexing. In FIG. 6, each baseband port is used to transmit to a different user out of four users: user 1, user 2, user 3, and user 4, such as the first radio node 431. Each BaseBand port is used for one component signal in different frequency band, as schematically represented by the striped rectangles, such as one part of the first signal, and all component signals belong to different users. Different stripe patterns correspond to different layers.

Figure 7:
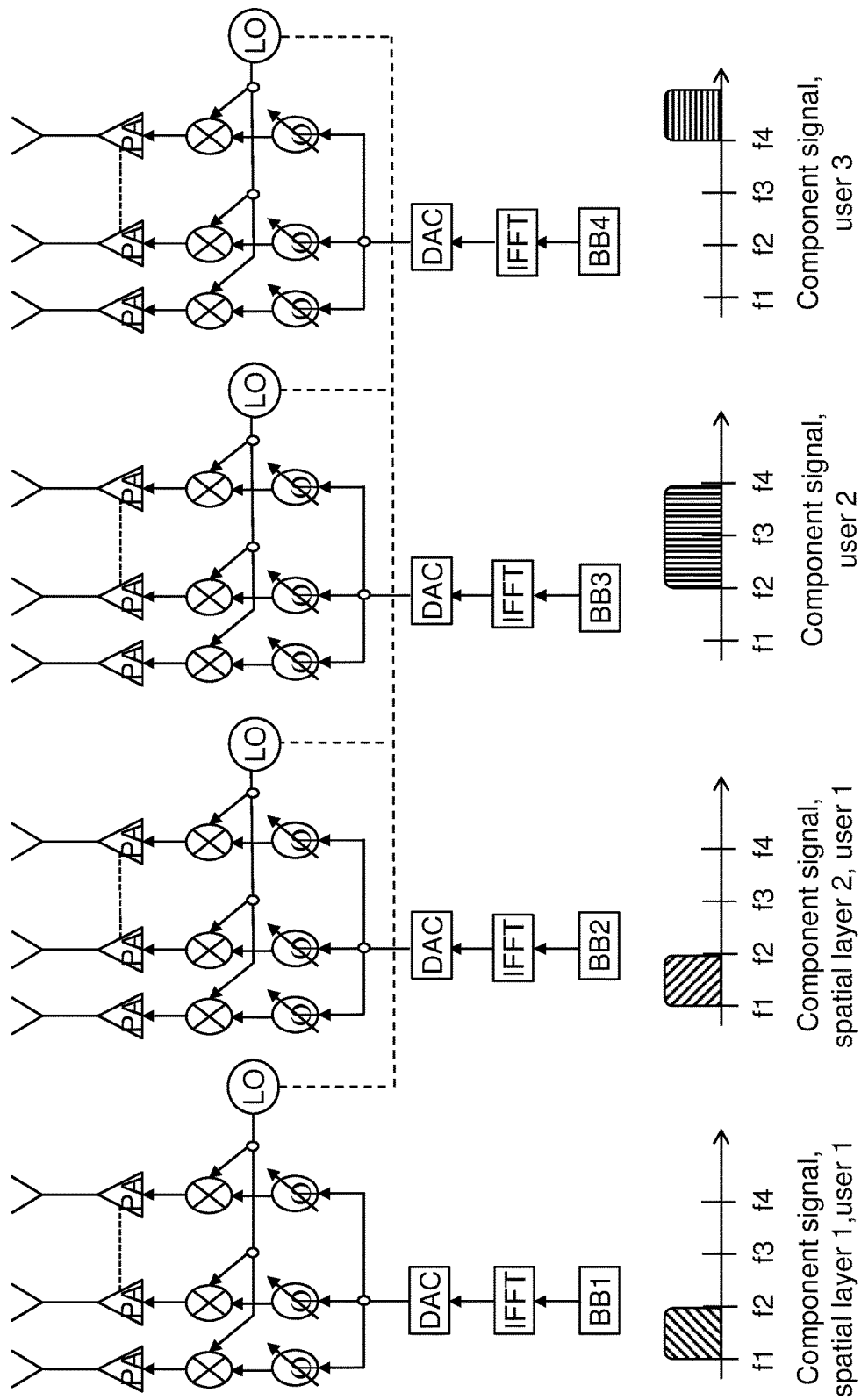
FIG. 7 is a schematic diagram depicting embodiments of a method in a radio network node, according to embodiments herein.

FIG. 7 depicts an example of possible Frequency Division Multiplexing together with Multiple-Input Multiple-Output. In FIG. 7, the first two BaseBand ports are used for Multiple-Input Multiple-Output, either to one user, i.e., user 1, single-user Multiple-Input Multiple-Output, as shown in the figure, or two users, Multi-user Multiple-Input Multiple-Output, which is not depicted in the FIG. 7. Thus, a component signal, e.g., a first spatial layer 1 for user 1, is input to BaseBand port 1, and another component signal, e.g., a second spatial layer 2 is input to BaseBand port 2 in the same frequency band as the first component signal, as schematically represented by the striped rectangles. BaseBand port 3 and 4 are used to serve two additional users: user 2 and user 3.

Figure 8:
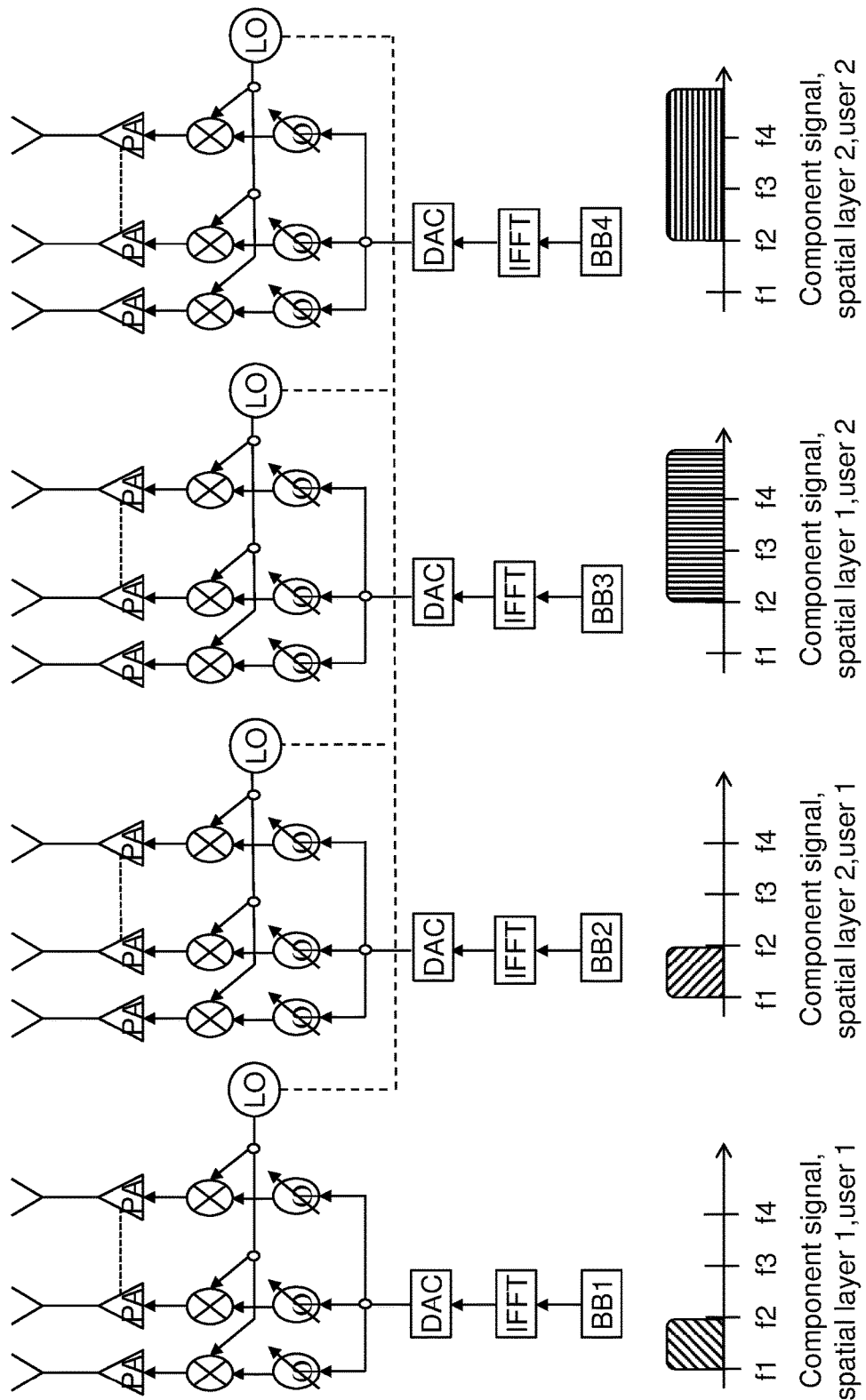
FIG. 8 is a schematic diagram depicting embodiments of a method in a radio network node, according to embodiments herein.

FIG. 8 depicts an example of possible Frequency Division Multiplexing together with Multiple-Input Multiple-Output. In FIG. 8, BaseBand port 1 and 2 are used for Multiple-Input Multiple-Output, either to one user, i.e., user 1, Single-user Multiple-Input Multiple-Output, as shown in the figure, or two users, Multi-user Multiple-Input Multiple-Output, which is not depicted in the FIG. 8. The same applies for BaseBand port 3 and 4, which are used to serve one additional user: user 2. Thus, a component signal, e.g., a first spatial layer 1 for user 1, is input to BaseBand port 1, and another component signal, e.g., a second spatial layer 2 is input to BaseBand port 2 in the same frequency band, as schematically represented by the striped rectangles. Similarly, a component signal, e.g., a first spatial layer 1 for user 2, is input to BaseBand port 3, and another component signal, e.g., a second spatial layer 2 for user 2 is input to BaseBand port 4 in the same frequency band, as schematically represented by the striped rectangles. The different frequency bands used for transmission are schematically represented by the striped rectangles.

Figure 9:
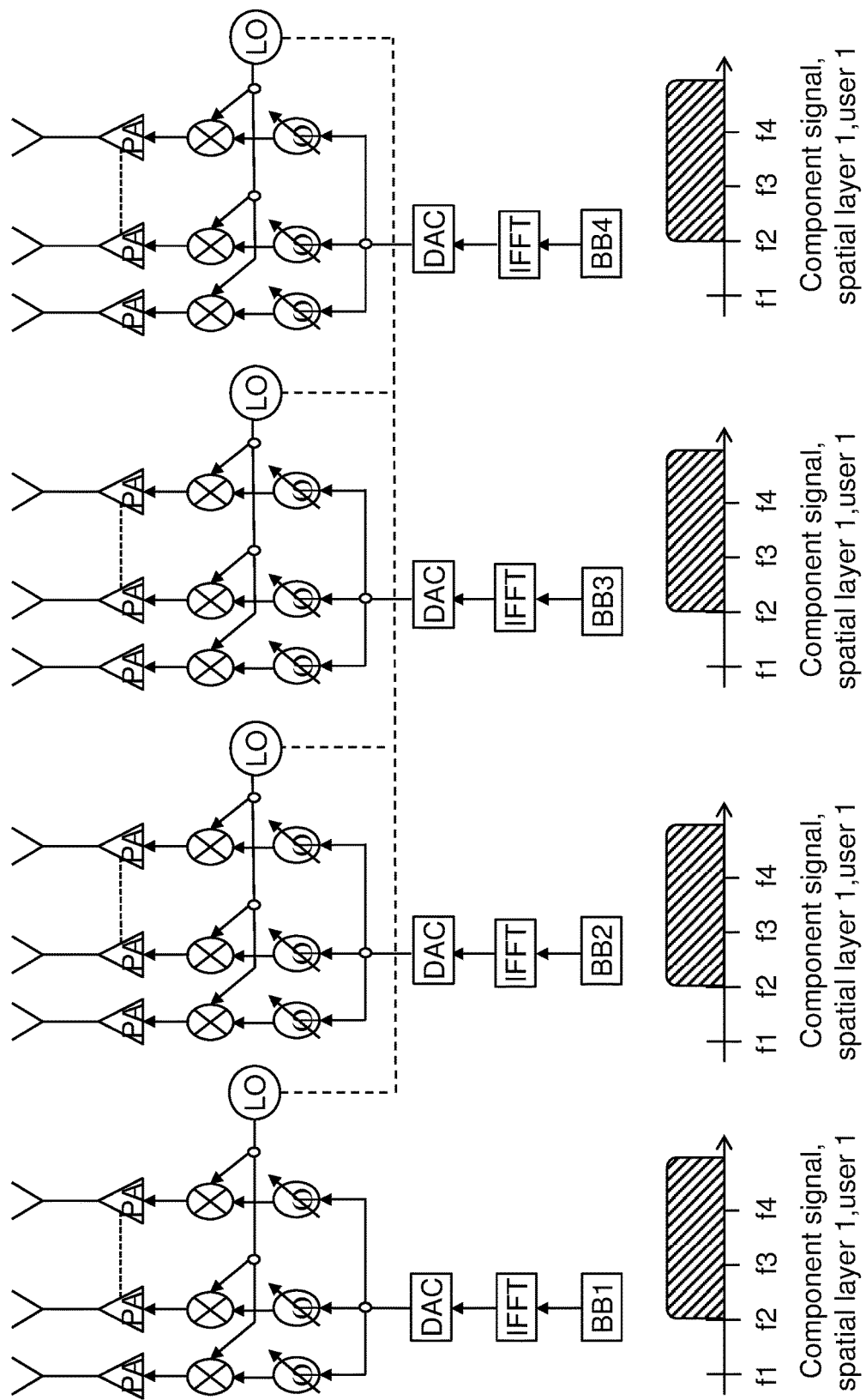
FIG. 9 is a schematic diagram depicting embodiments of a method in a radio network node, according to embodiments herein.

FIG. 9 depicts an example wherein all BaseBand ports are used to serve a single user with aggregated transmit power of all Power Amplifiers. All BaseBand port signals are the same and are beamformed in similar direction to focus energy to the desired user to aggregate array gain and transmit power of all Power Amplifiers and subarrays. This may enable control of the array gain such that some transmissions get a high array gain to improve coverage while other transmissions get a lower array gain by only utilizing a single or a subset of the BaseBand ports. For example, a transmission with a large elevation angle, or down-tilt, intended for a user in the vicinity of the base station may imply restrictions in terms of Equivalent Isotropically Radiated Power and may thus require a lower antenna gain and/or output power.

Thus, in some embodiments, the one or more parts of the first signal are beamformed in a same spatial direction or polarization, by configuring the determined number of radio chains with equal beamforming weights, i.e., the same beamforming weights.

In another example, the BaseBand port signals are beamformed in different spatial directions or polarizations to provide spatial or polarization diversity by transmitting portions of a single signal in each baseband port in different time and/or frequency intervals or by utilizing a space-time/frequency block code.

Thus, the one or more parts of the first signal may be beamformed in different spatial directions or polarizations, by transmitting each of the one or more parts of the first signal in different time and/or frequency intervals or by utilizing a space-time/frequency block code.

In all above shown examples the phase shifters are operating on baseband signals. However, embodiments herein may not depend on the exact placement of the phase shifters, i.e. embodiments herein work also with the phase shifters operating at other stages in the signal processing chain, e.g. at RF or at some intermediate frequency. In the above shown examples, the phase shift is done in the analogue domain after the Digital to Analog Converters. The phase shift might as well be applied in the digital domain before the Digital to Analog Converters.

In all above shown examples, each BaseBand port has a separate Local Oscillator, which may be synchronized to one another. That is, in some embodiments, each radio chain has a Local Oscillator and the Local Oscillator of the determined number of radio chains are synchronized in time and frequency with a phase relationship. Such synchronization may be used to obtain a correct collective beam forming, as the antenna element arrays of the determined number of radio chains may now effectively form a larger beam forming antenna array.

However, embodiments herein may not depend on the exact realization of the Local Oscillator, e.g., if a common Local Oscillator is used for all BaseBand ports, if each BaseBand port has its own Local Oscillator that is/is not synchronized to other Local Oscillators, etc. . . . . Embodiments herein may neither depend on the exact realization of the Local Oscillator and mixer, e.g., if the mixing is done in one step or in multiple steps via an intermediate frequency.

When two or more BaseBand ports serve a single user either through Multiple-Input Multiple-Output or simply to achieve transmit power aggregation, the corresponding Local Oscillator sources may be synchronized both in frequency and in phase. While frequency synchronization may be guaranteed with a common frequency reference, the phase synchronization between two Phase-Locked Loops generally may not be guaranteed without additional measures to synchronize states of the Phase-Locked Loops. Alternatively, a common Local Oscillator source may be used.

In relation to action 503, and as mentioned earlier, the hardware shown in FIGS. 6-11 may then be used to transmit:

1. one spatial layer per baseband port, multiple layers may be addressed all to the same users or to different users; and/or 2. one spatial layer per groups of BaseBand ports, aggregating power and antenna gain for that layer, multiple layers may be addressed all to the same users or to different users; and/or 3. one Frequency Division Multiplexing or Code Division Multiplexing component signal per baseband port, multiple Frequency Division Multiplexing or Code Division Multiplexing component signals may be addressed all to the same users or to different users.

Embodiments herein enable Frequency Division Multiplexing and Code Division Multiplexing of different users, any of which may be such as the first radio node 431. This may be done while at the same time maintaining a low Peak to Average Power Ratio of the input signal to the Power Amplifier, see any Power Amplifier in FIGS. 6-11, provided the one or more parts of the first signal, e.g. the component signal, itself has low Peak to Average Power Ratio. This enables smaller and more power-efficient Power Amplifiers, which leads to the advantages of: lower cost, lower size, lower power consumption, and lower need for cooling of the transmission system.

Embodiments of the technique provided herein are advantageous not only because they allow low Peak to Average Power Ratio signals, but also because each BaseBand port and associated circuitry may only need to operate on the bandwidth of the Frequency Division Multiplexing allocation. For example, the different Local Oscillator sources, implemented as Phase-Locked Loops (PLL), may be synchronized in that they use the same frequency reference, but each Phase-Locked Loops associated with one antenna system may be configured independently to generate a Local Oscillator frequency corresponding to the centre frequency of the Frequency Division Multiplexing allocation. A lower bandwidth requirement on the baseband side, for example, analogue, mixed-signal, e.g. analogue-to-digital and digital-to-analogue converters, and digital building blocks, may enable lower power consumption.

EXEMPLARY EMBODIMENTS

Exemplary First Embodiment: Power Aggregation with Phase Coherency Requirements on the Radio Chains In a first embodiment, multiple radio chains may be assigned to the radio transmission of the first signal in order to achieve a higher output power for the first signal than what is possible using a single radio chain, i.e., power is aggregated by combining multiple radio chains.

Different signals, also referred to herein as layers or streams, are frequency, spatially or code multiplexed. Different streams may address a single user or multiple users. Power, as well as antenna gain, may be aggregated by partitioning the stream, i.e., the first signal, into parts of the first signal, wherein each of the parts of the first signal is identical to the first signal up to a scaling factor, e.g., 1 over the square root of Ns, and then transmitting each of the parts of the first signal on different radio chains. Let $N^s$ be the number of active arrays/radio chains, and also the number of parts of the first signal, for stream s, i.e., the first signal, and it is determined based on three different parameters, of the one or more parameters: $P_{max}$, which is a particular embodiment of the limitations on the maximum output power per power amplifier comprised in each of the two or more radio chains $G_{subarray}$, which is a fixed system parameter, and $EIRP^s$, which is a particular embodiment of the output power required for the transmission of the first signal and of the targeted array gain for the transmission of the first signal. Let $P_{max}$ be the maximum output power of a single radio chain and $G_{subarray}$ be the antenna gain of the subarray connected to a single radio chain. Let $EIRP^s$ be the targeted Equivalent Isotropically Radiated Power for stream s. The Equivalent Isotropically Radiated Power is given according to $$EIRP^s = PG = \underbrace{N^s P_{max}}_{P} \underbrace{N^s G_{subarray}}_{G}.$$

The $EIRP^s$ may be based on the scheduling decision.

In this embodiment, the number of radio chains used for a given transmission is determined by $$N^s = \left\lceil \sqrt{\frac{EIRP_s}{P_{max} G_{subarray}}} \right\rceil.$$

Figure 10:
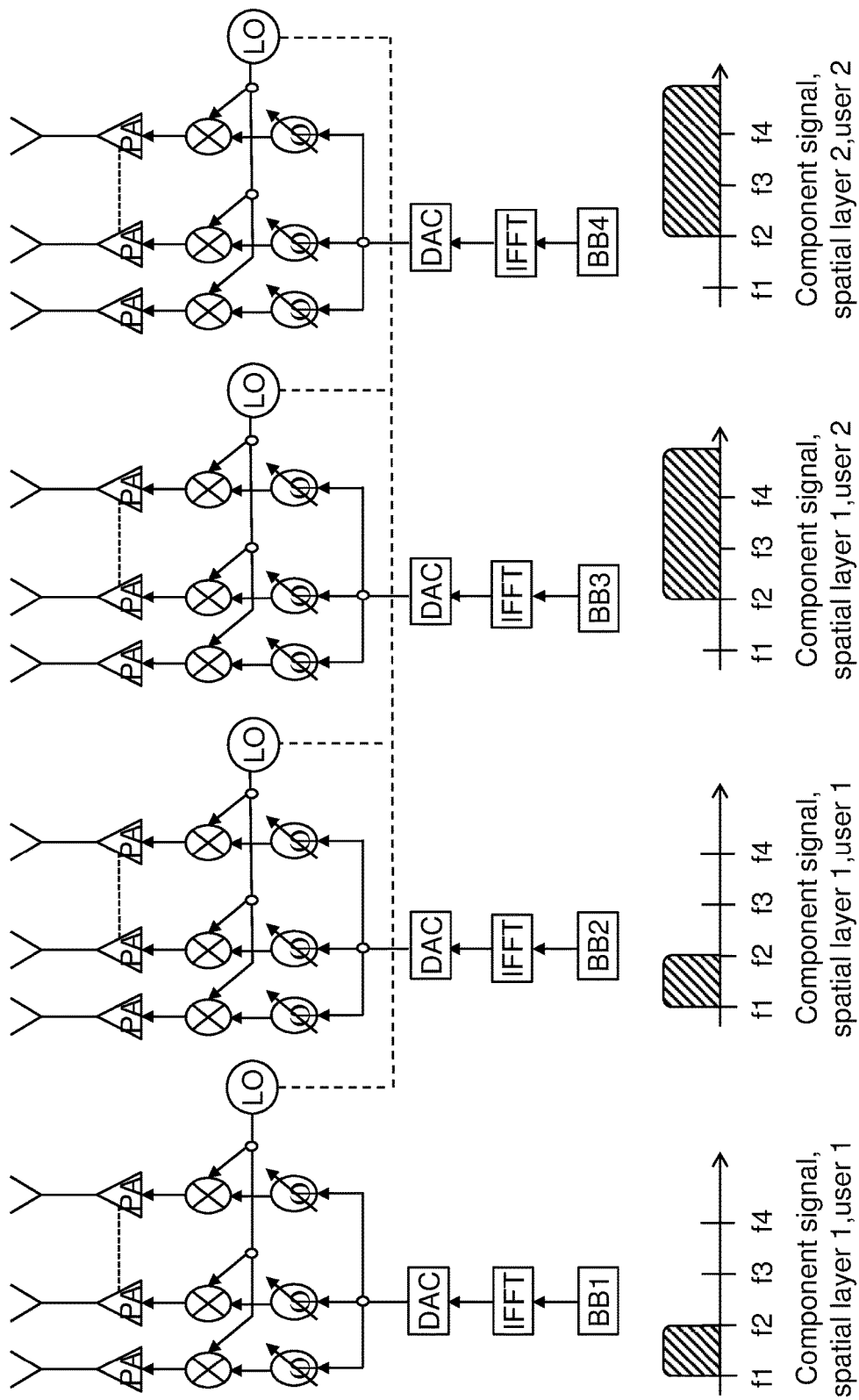
FIG. 10 is a schematic diagram depicting embodiments of a method in a radio network node, according to embodiments herein.

FIG. 9 and FIG. 10 illustrate schematically the example of the first embodiment. In FIG. 9, power as well as antenna gain is aggregated by transmitting the same stream, i.e., spatial layer 1, in multiple (=4) radio chains for user 1. In FIG. 10, power as well as antenna gain is aggregated by transmitting the same stream, i.e., spatial layer 1, in multiple (=2) radio chains for user 1 while the other two radio chains are used for Frequency Division Multiplexing of another user, user 2, with two layers Multiple-Input Multiple-Output.

Exemplary Second Embodiment: Power Aggregation with Relaxed Coherency Requirements on the Radio Chains In a second embodiment, different streams are frequency, spatially or code multiplexed, addressing a single user or multiple users. Power is aggregated by dividing a stream into multiple frequency components, each frequency component being a part of the first signal, transmitted using different radio chains. Let $N^s$ be the number of active arrays/radio chains for stream s, i.e., the first signal, and it is determined based on two different parameters, of the one or more parameters: $P_{max}$, defined as before, and $P^s$, which is a particular embodiment of the output power required for the transmission of the first signal. Let $P_{max}$ be the maximum output power of a single radio chain. Let $P^s$ be the nominal total output power for stream s, and let the total number of self-contained frequency resources, such physical resource blocks groups (PRGs) in LTE, of stream s be $C^s$. $P^s$ and $C^s$ may be based on the scheduling decision.

The number of radio chains used for a given transmission may be determined by $$N^s = \left\lceil \frac{P^s}{P_{max}} \right\rceil$$

And the partitioning of the frequency resources, i.e., Frequency Division Multiplexing resources in this case, may be made so that radio chain n transmits on $C_n^s$ frequency resources, preferably consecutive to reduce bandwidth and Peak to Average Power Ratio, where:

$$C_n^s = \left\lceil \frac{C^s}{N^s N_B} \right\rceil N_B \text{ for } n = 0 \ldots (N^s - 2)$$

$$C_n^s = C^s - (N^s - 1)\left\lceil \frac{C^s}{N^s N_B} \right\rceil N_B \text{ for } n = (N^s - 1)$$

where $N_B$ is the largest bandwidth, in terms of frequency resources, over which the receiver may interpolate the channel. Thus, the partitioning of s, i.e., the first signal, is based on one of the one or more parameters. $N_B$ is a particular embodiment of one out of: a Frequency Division Multiplexing, Frequency Division Multiplexing, Code Division Multiplexing, Code Division Multiplexing, and a combination of Frequency Division Multiplexing and Code Division Multiplexing, Frequency Division Multiplexing/Code Division Multiplexing, allocation of the transmission intended for the first radio node 431.

Figure 11:
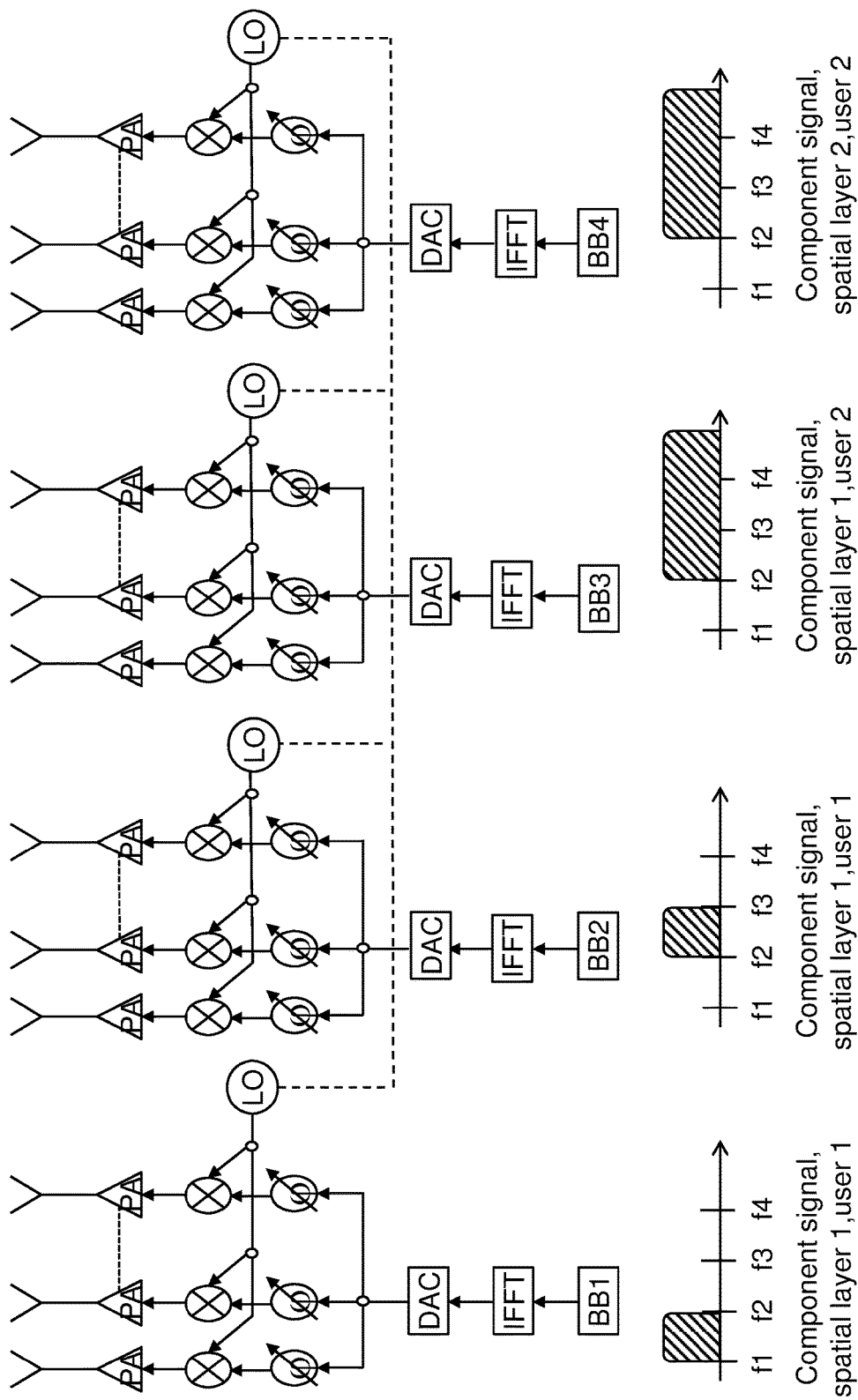
FIG. 11 is a schematic diagram depicting embodiments of a method in a radio network node, according to embodiments herein.

FIG. 11 illustrates schematically the example of the second embodiment. Power is aggregated by dividing a stream, i.e., spatial layer 1, into multiple (=2) frequency components transmitted using different radio chains, for user 1, while the other two radio chains are used for Frequency Division Multiplexing of another user, user 2, with two layers Multiple-Input Multiple-Output.

In some embodiments, K streams may be transmitted to L users, so that L is less than or equal to K, with Z available radio chains, with a predefined power allocation per stream. This may be performed: a) with absolute power per stream, or, b) trying to get as much power as possible, distributed in a given way among the streams.

To perform the method actions described above in relation to FIGS. 5-11, the radio network node 410 is configured to determine a partitioning of a first signal into one or more parts to be transmitted to a first radio node 431. The radio network node 410 comprises the following arrangement depicted in FIG. 12. As stated earlier, the radio network node 410 comprises the two or more antennas. Each of the two or more antennas is associated with a respective radio chain out of the two or more radio chains comprised in the radio network node 410. Also as stated earlier, the radio network node 410 and the first radio node 431 are configured to operate in the wireless communications network 400.

The detailed description of some of the following corresponds to the same references provided above, in relation to the actions described for the radio network node 410, and will thus not be repeated here.

The radio network node 410 is configured to, e.g., by means of a determining module 1201 configured to, determine the number of radio chains out of the two or more radio chains, to be used to send the first signal to the first radio node 431. The determining module 1201 may be a processor 1203 of the radio network node 410.

In some embodiments, the number of radio chains is configured to be determined based on the function of the at least: the Equivalent Isotropically Radiated Power, EIRP, for the first signal, the maximum output power of a single radio chain of the two or more radio chains and the antenna gain of an antenna element subarray connected to a single radio chain, wherein the Equivalent Isotropically Radiated Power is based on the scheduling decision.

In other embodiments, the number of radio chains is configured to be determined based on the function of at least: the maximum output power of a single radio chain of the two or more radio chains and a nominal total output power for the first signal. The maximum output power of the single radio chain may be based on the scheduling decision. In some embodiments, the nominal total output power for the first signal is based on the scheduling decision.

The radio network node 410 is further configured to, e.g. by means of the determining module 1201 configured to determine the partitioning of the first signal into the one or more parts of the first signal over the determined number of radio chains, that is, the first signal to be transmitted over the determined number of radio chains. The one or more parts are to be transmitted to the first radio node 431.

To determine the number of radio chains and to determine the partitioning are based on the scheduling decision associated with the radio network node 410, and the one or more parameters.

In some embodiments, the scheduling decision comprises the number of signals to be transmitted in the time period to the one or more radio nodes 430 comprising the first radio node 431. The one or more parameters are associated with the number of signals.

In some embodiments, the one or more parameters comprise the at least one of:

the one out of: a Frequency Division Multiplexing, Frequency Division Multiplexing, Code Division Multiplexing, Code Division Multiplexing, and the combination of Frequency Division Multiplexing and Code Division Multiplexing, Frequency Division Multiplexing/Code Division Multiplexing, allocation of the transmission intended for the first radio node 431, the number of signals, comprising the first signal, intended for the first radio node 431, the number of radio chains available for transmission in the determined time period, the usage of each of the available radio chains by other transmissions to the second radio nodes 432 comprised in the wireless communications network 400, the output power required for the transmission of the first signal, the targeted array gain for the transmission of the first signal, the limitation imposed by the first radio node 431 on continuity of the radio channel over the Frequency Division Multiplexing, Code Division Multiplexing or Frequency Division Multiplexing/Code Division Multiplexing allocation, the limitations on the maximum output power per power amplifier comprised in each of the two or more radio chains, the limitations on the maximum Peak to Average Power Ratio, PAPR, for transmission of the one or more parts of the first signal on the single radio chain, and the limitations on the power consumption in any given transmission.

In some embodiments, each one of the number of radio chains is used to convert the respective part out of the one or more parts of the first signal into the respective radio signal to be transmitted to the first radio node 431.

In some embodiments, the number of signals comprises the first signal, each signal out of the number of signals is a layer, and each layer comprises information for a single radio node out of the one or more radio nodes 430.

In some embodiments, each of the one or more parts of the first signal is a component signal of the layer.

In some embodiments, to determine the partitioning comprises to determine at least one of: a) the first radio signal is to be transmitted per one radio chain of the two or more radio chains, b) the first radio signal is to be transmitted per group of radio chains of the two or more radio chains, and c) one out of a Frequency Division Multiplexing component signal, a Code Division Multiplexing component signal and a Frequency Division Multiplexing/Code Division Multiplexing component signal is to be transmitted per one radio chain of the two or more radio chains.

In some embodiments, the partitioning is configured to be made on Frequency Division Multiplexing resources, so that a radio chain of the two or more radio chains transmits on Frequency Division Multiplexing resources, and the partitioning is configured to be determined based on the function of the at least: the total number of self-contained Frequency Division Multiplexing resources of the first signal, based on the scheduling decision, and the largest bandwidth in terms of Frequency Division Multiplexing resources over which the first radio node 431 is configured to interpolate the channel to be computed by the first radio node 431 for demodulation of the one or more parts of the first signal, wherein the total number of self-contained Frequency Division Multiplexing resources is based on the scheduling decision.

The radio network node 410 may be configured to, e.g. by means of a transmitting module 1202 configured to, transmit the one or more parts of the first signal over the determined number of radio chains to the first radio node 431, wherein each of the one or more parts of the first signal are configured to be respectively transmitted as radio signals. The transmitting module 1202 may also be the processor 1203 of the radio network node 410.

In some embodiments, the one or more parts of the first signal are configured to be beamformed in different spatial directions or polarizations, by transmitting each of the one or more parts of the first signal in different time and/or frequency intervals or by utilizing a space-time/frequency block code.

In some embodiments, the one or more parts of the first signal are configured to be beamformed in the same spatial direction or polarization, by configuring the determined number of radio chains with equal beamforming weights.

In some embodiments, each radio chain has a Local Oscillator and the Local Oscillator of the determined number of radio chains are configured to be synchronized in time and frequency with a phase relationship.

Figure 12:
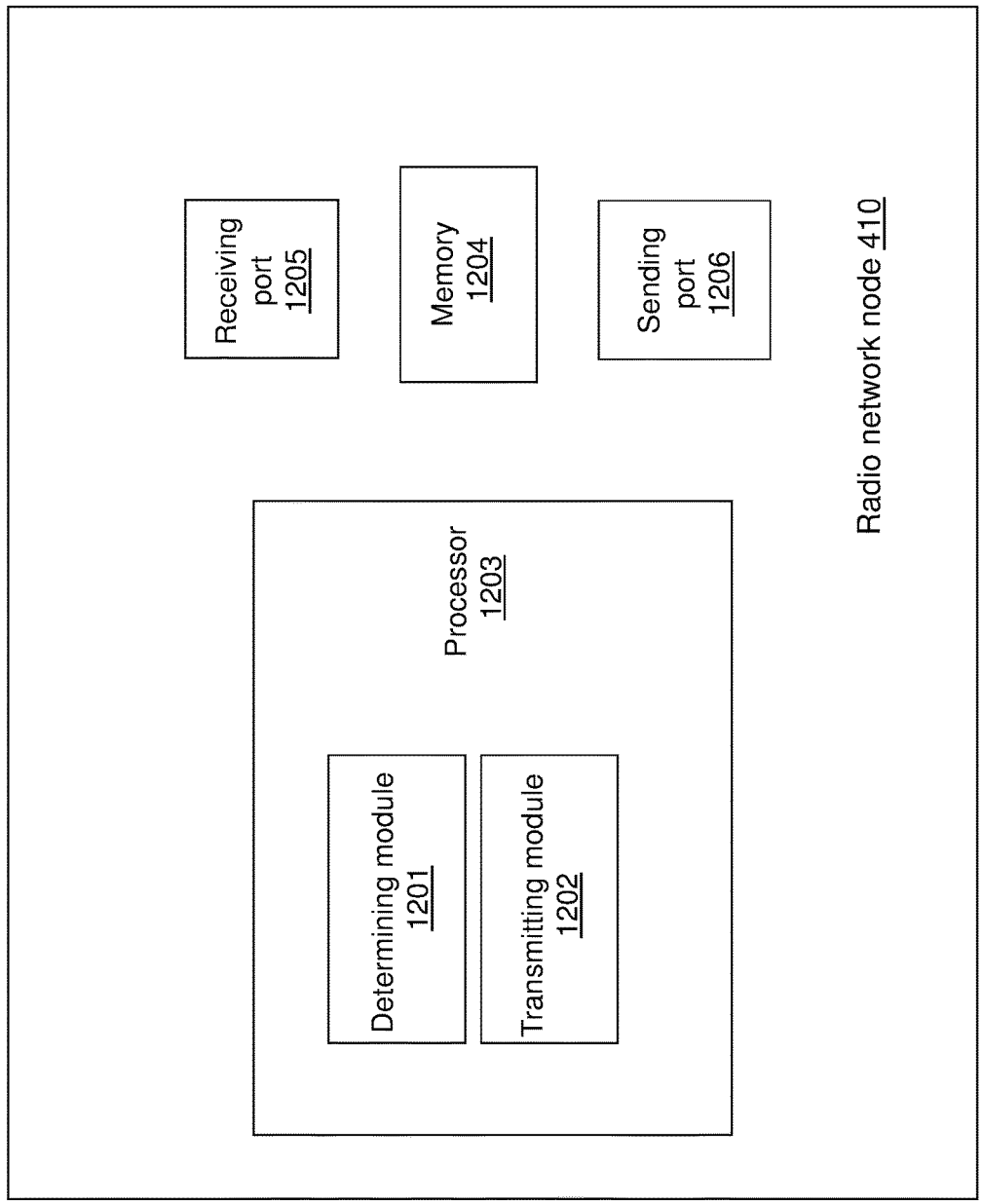
FIG. 12 is a schematic block diagram illustrating embodiments of a network node, according to embodiments herein.

The embodiments herein to transmit one or more parts of a first signal to a first radio node 431 may be implemented through one or more processors, such as the processor 1203 in the radio network node 410 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the radio network node 410. One such carrier may be in the form of a CD ROM disc. It may be however feasible with other data carriers such as a memory stick. The computer program code may furthermore be provided as pure program code on a server and downloaded to the radio network node 410.

The radio network node 410 may further comprise a memory 1204 comprising one or more memory units. The memory 1204 may be arranged to be used to store data in relation to applications to perform the methods herein when being executed in the radio network node 410. Memory 1204 may be in communication with the processor 1203. Any of the other information processed by the processor 1203 may also be stored in the memory 1204.

In some embodiments, information may be received from, e.g., the first radio node 431, any of the radio nodes comprised in the one or more radio nodes 430, or any of the radio nodes comprised in the second radio nodes 432, through a receiving port 1205. In some embodiments, the receiving port 1205 may be, for example, connected to the two or more antennas in the radio network node 410. In other embodiments, the radio network node 410 may receive information from another structure in the wireless communications network 400 through the receiving port 1205. Since the receiving port 1205 may be in communication with the processor 1203, the receiving port 1205 may then send the received information to the processor 1203. The receiving port 1205 may also be configured to receive other information.

The information processed by the processor 1203 in relation to the embodiments of the method herein may be stored in the memory 1204 which, may be in communication with the processor 1203, as stated earlier, and with the receiving port 1205.

The processor 1203 may be further configured to transmit or send information, such as the one or more parts of the first signal, to e.g., the first radio node 431, any of the radio nodes comprised in the one or more radio nodes 430, or any of the radio nodes comprised in the second radio nodes 432, through a sending port 1206, which may be in communication with the processor 1203, and the memory 1204.

Those skilled in the art will also appreciate that the different modules 1201-1202 described above may refer to a combination of analog and digital modules, and/or one or more processors configured with software and/or firmware, e.g., stored in memory, that, when executed by the one or more processors such as the processor 1203, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1201-1202 described above may be implemented as one or more applications running on one or more processors such as the processor 1203.

Thus, the methods according to the embodiments described herein for the radio network node 410 may be respectively implemented by means of a computer program product, comprising instructions, i.e., software code portions, which, when executed on at least one processor, cause the at least one processor to carry out the actions described herein, as performed by the radio network node 410. The computer program product may be stored on a computer-readable storage medium. The computer-readable storage medium, having stored thereon the computer program, may comprise instructions which, when executed on at least one processor, cause the at least one processor to carry out the actions described herein, as performed by the radio network node 410. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The modules described may be for performing any of the pertinent embodiments described.

The embodiments herein are not limited to the above described preferred embodiments. Various alternatives, modifications and equivalents may be used. Therefore, the above embodiments should not be taken as limiting the scope of the invention.

The invention claimed is:

1. A method performed by a radio network node for determining a partitioning of a first signal into one or more parts to be transmitted to a first radio node, wherein the radio network node comprises two or more antennas, wherein each of the two or more antennas is associated with a respective radio chain out of two or more radio chains comprised in the radio network node, and wherein the radio network node and the first radio node are operating in a wireless communications network, the method comprising:
   determining a number of radio chains out of the two or more radio chains, to be used to send the first signal to the first radio node; and
   determining the partitioning of the first signal into the one or more parts of the first signal over the determined number of radio chains, wherein the one or more parts are to be transmitted to the first radio node,
wherein the determining the number of radio chains and the determining the partitioning are based on a scheduling decision associated with the radio network node, and based on one or more parameters.

2. The method of claim 1, further comprising transmitting the one or more parts of the first signal over the determined number of radio chains to the first radio node, wherein each of the one or more parts of the first signal is transmitted as a respective radio signal.

3. The method of claim 1, wherein the scheduling decision comprises a number of signals to be transmitted in a time period to one or more radio nodes comprising the first radio node, and wherein the one or more parameters are associated with the number of signals.

4. The method of claim 1, wherein the one or more parameters comprise at least one of:
   one out of: Frequency Division Multiplexing (FDM), Code Division Multiplexing (CDM), and a combination of FDM and CDM (FDM/CDM), allocation of a transmission intended for the first radio node,
   a number of signals, comprising the first signal, intended for the first radio node,
   a number of radio chains available for transmission in a determined time period,
   a usage of each of the available radio chains by other transmissions to second radio nodes comprised in the wireless communications network,
   an output power required for transmission of the first signal,
   a targeted array gain for the transmission of the first signal,
   a limitation imposed by the first radio node on continuity of a radio channel over the FDM, CDM, or FDM/CDM allocation,
   limitations on the maximum output power per power amplifier comprised in each of the two or more radio chains,
   limitations on the maximum Peak to Average Power Ratio (PAPR) for transmission of the one or more parts of the first signal on a single radio chain, and
   limitations on the power consumption in any given transmission.

5. The method of claim 1, wherein each one of the number of radio chains is used to convert a respective part out of the one or more parts of the first signal into a respective radio signal to be transmitted to the first radio node.

6. The method of claim 3, wherein the number of signals comprises the first signal, wherein each signal out of the number of signals is a layer, and wherein each layer comprises information for a single radio node out of the one or more radio nodes.

7. The method of claim 6, wherein each of the one or more parts of the first signal is a component signal of the layer.

8. The method of claim 7, wherein the determining the partitioning comprises determining at least one of that:
   the first signal is to be transmitted per one radio chain of the two or more radio chains,
   the first signal is to be transmitted per group of radio chains of the two or more radio chains, and
   one out of: a Frequency Division Multiplexing (FDM) component signal, a Code Division Multiplexing (CDM) component signal, and an FDM/CDM component signal is to be transmitted per one radio chain of the two or more radio chains.

9. The method of claim 2, wherein the one or more parts of the first signal are beam-formed in different spatial directions or polarizations, by transmitting each of the one or more parts of the first signal in different time and/or frequency intervals or by utilizing a space-time/frequency block code.

10. The method of claim 2, wherein the one or more parts of the first signal are beam-formed in a same spatial direction or polarization, by configuring the determined number of radio chains with equal beamforming weights.

11. The method of claim 1, wherein each radio chain has a Local Oscillator (LO), and wherein the LO of the determined number of radio chains are synchronized in time and frequency with a phase relationship.

12. The method of claim 1, wherein the number of radio chains is determined based on a function of at least: an Equivalent Isotropically Radiated Power (EIRP) for the first signal, a maximum output power of a single radio chain of the two or more radio chains, and an antenna gain of an antenna element subarray connected to a single radio chain, and wherein the EIRP is based on the scheduling decision.

13. The method of claim 1, wherein the number of radio chains is determined based on a function of at least: a maximum output power of a single radio chain of the two or more radio chains and a nominal total output power for the first signal.

14. The method of claim 1, wherein the partitioning is made on Frequency Division Multiplexing (FDM) resources, so that a radio chain of the two or more radio chains transmits on the FDM resources, wherein the partitioning is determined based on a function of at least: a total number of self-contained FDM resources of the first signal, the scheduling decision, and a largest bandwidth in terms of the FDM resources over which the first radio node interpolates a channel to be computed by the first radio node for demodulation of the one or more parts of the first signal, and wherein the total number of self-contained FDM resources is based on the scheduling decision.

15. A non-transitory computer-readable medium comprising, stored thereupon, a computer program comprising instructions that, when executed on at least one processor of a radio network node operating in a wireless communications network and comprising two or more antennas, each of the two or more antennas being associated with a respective radio chain out of two or more radio chains in the radio network node, cause the at least one processor to determine a partitioning of a first signal into one or more parts to be transmitted to a first radio node by:
  determining a number of radio chains out of the two or more radio chains, to be used to send the first signal to the first radio node; and
  determining the partitioning of the first signal into the one or more parts of the first signal over the determined number of radio chains, wherein the one or more parts are to be transmitted to the first radio node, such that the determining the number of radio chains and the determining the partitioning are based on a scheduling decision associated with the radio network node, and based on one or more parameters.

16. A radio network node configured to determine a partitioning of a first signal into one or more parts to be transmitted to a first radio node, wherein the radio network node comprises two or more antennas, and wherein each of the two or more antennas is associated with a respective radio chain out of two or more radio chains comprised in the radio network node, the radio network node and the first radio node being configured to operate in a wireless communications network, the radio network node comprising a processor and memory configured to:
  determine a number of radio chains out of the two or more radio chains, to be used to send the first signal to the first radio node, and
  determine the partitioning of the first signal into the one or more parts of the first signal over the determined number of radio chains, wherein the one or more parts are to be transmitted to the first radio node,
  wherein the determination of the number of radio chains and the determination of the partitioning are based on a scheduling decision associated with the radio network node, and based on one or more parameters.

17. The radio network node of claim 16, wherein the processor and the memory are further configured to:
  transmit the one or more parts of the first signal over the determined number of radio chains to the first radio node, wherein each of the one or more parts of the first signal is configured to be transmitted as a respective radio signal.

18. The radio network node of claim 16, wherein the scheduling decision comprises a number of signals to be transmitted in a time period to one or more radio nodes comprising the first radio node, and wherein the one or more parameters are associated with the number of signals.

19. The radio network node of claim 16, wherein the one or more parameters comprise at least one of:
  one out of: Frequency Division Multiplexing (FDM), Code Division Multiplexing (CDM), and a combination of FDM and CDM (FDM/CDM), allocation of a transmission intended for the first radio node,
  a number of signals, comprising the first signal, intended for the first radio node,
  a number of radio chains available for transmission in a determined time period,
  a usage of each of the available radio chains by other transmissions to second radio nodes comprised in the wireless communications network,
  an output power required for transmission of the first signal,
  a targeted array gain for the transmission of the first signal,
  a limitation imposed by the first radio node on continuity of a radio channel over the FDM, CDM, or FDM/CDM allocation,
  limitations on the maximum output power per power amplifier comprised in each of the two or more radio chains,
  limitations on the maximum Peak to Average Power Ratio (PAPR) for transmission of the one or more parts of the first signal on a single radio chain, and
  limitations on the power consumption in any given transmission.

20. The radio network node of claim 16, wherein each one of the number of radio chains is used to convert a respective part out of the one or more parts of the first signal into a respective radio signal to be transmitted to the first radio node.

21. The radio network node of claim 18, wherein the number of signals comprises the first signal, wherein each signal out of the number of signals is a layer, and wherein each layer comprises information for a single radio node out of the one or more radio nodes.

22. The radio network node of claim 21, wherein each of the one or more parts of the first signal is a component signal of the layer.

23. The radio network node of claim 22, wherein the processor and the memory are configured to determine the partitioning by determining at least one of that:
  the first signal is to be transmitted per one radio chain of the two or more radio chains,
  the first signal is to be transmitted per group of radio chains of the two or more radio chains, and
  one out of: a Frequency Division Multiplexing (FDM) component signal, a Code Division Multiplexing (CDM) component signal, and an FDM/CDM component signal is to be transmitted per one radio chain of the two or more radio chains.

24. The radio network node of claim 17, wherein the one or more parts of the first signal are configured to be beam-formed in different spatial directions or polarizations, by transmitting each of the one or more parts of the first signal in different time and/or frequency intervals or by utilizing a space-time/frequency block code.

25. The radio network node of claim 17, wherein the one or more parts of the first signal are configured to be beam-formed in a same spatial direction or polarization, by configuring the determined number of radio chains with equal beamforming weights.

26. The radio network node of claim 16, wherein each radio chain has a Local Oscillator (LO), and wherein the LO of the determined number of radio chains are configured to be synchronized in time and frequency with a phase relationship.

27. The radio network node of claim 16, wherein the number of radio chains is configured to be determined based on a function of at least: an Equivalent Isotropically Radiated Power (EIRP) for the first signal, a maximum output power of a single radio chain of the two or more radio chains, and an antenna gain of an antenna element subarray connected to a single radio chain, and wherein the EIRP is based on the scheduling decision.

28. The radio network node of claim 16, wherein the number of radio chains is configured to be determined based on a function of at least: a maximum output power of a single radio chain of the two or more radio chains and a nominal total output power for the first signal.

29. The radio network node of claim 17, wherein the partitioning is configured to be made on Frequency Division Multiplexing (FDM) resources, so that a radio chain of the two or more radio chains transmits on the FDM resources, wherein the partitioning is configured to be determined based on a function of at least: a total number of self-contained FDM resources of the first signal, the scheduling decision, and a largest bandwidth in terms of the FDM resources over which the first radio node is configured to interpolate a channel to be computed by the first radio node for demodulation of the one or more parts of the first signal, and wherein the total number of self-contained FDM resources is based on the scheduling decision.

\* \* \* \* \*